US012771223B2

(12) United States Patent
Prüssmeier et al.

(10) Patent No.: US 12,771,223 B2
(45) Date of Patent: Oct. 20, 2026

(54) METHOD FOR CONTROLLING A PLANAR DRIVE SYSTEM AND PLANAR DRIVE SYSTEM

(71) Applicant: Beckhoff Automation GmbH, Verl (DE)

(72) Inventors: Uwe Prüssmeier, Lemgo (DE); Jan Achterberg, Duisburg (DE)

(73) Assignee: Beckhoff Automation GmbH, Verl (DE)

(*) Notice: Subject to any disclaimer, the term of this patent is extended or adjusted under 35 U.S.C. 154(b) by 260 days.

(21) Appl. No.: 18/295,525

(22) Filed: Apr. 4, 2023

(65) Prior Publication Data

US 2023/0238868 A1 Jul. 27, 2023

Related U.S. Application Data

(63) Continuation of application No. PCT/EP2021/078245, filed on Oct. 13, 2021.

(30) Foreign Application Priority Data

Oct. 14, 2020 (DE) ........................ 102020127012.7

(51) Int. Cl.
*H02K 41/03* (2006.01)
*B01F 31/00* (2022.01)
(Continued)

(52) U.S. Cl.
CPC ........... *H02K 41/031* (2013.01); *B01F 31/22* (2022.01); *B01F 31/27* (2022.01); *B01F 31/70* (2022.01);
(Continued)

(58) Field of Classification Search
CPC ........ B01F 31/201; B01F 31/22; B01F 31/27; B01F 31/70; B01F 35/213; B65G 11/023;
(Continued)

(56) References Cited

U.S. PATENT DOCUMENTS 6,836,315 B2 12/2004 Roes
8,550,233 B2 10/2013 Perroud et al.
(Continued)

FOREIGN PATENT DOCUMENTS

CN 109073140 A 12/2018
DE 946334 C 7/1956
(Continued)

OTHER PUBLICATIONS

International Search Report and Written Opinion dated Feb. 1, 2022 in connection with International Patent Application No. PCT/EP2021/078245, 19 pages including English translation.
(Continued)

*Primary Examiner* — Christopher M Koehler
*Assistant Examiner* — Ethan Nguyen Vo
(74) *Attorney, Agent, or Firm* — Dorsey & Whitney LLP

(57) ABSTRACT

This application provides a method for controlling a planar drive system, where the planar drive system comprises at least a controller, a stator module having a stator surface, and a rotor that may is positionable and movable on the stator surface. The method comprises positioning an object on a rotor in a first arrangement state of the object in a positioning step, carrying out an accelerating movement of a defined movement pattern of the rotor; and, by the accelerating movement, arranging the object positioned on the rotor in the first arrangement state in a second arrangement state relative to the rotor, in an arranging step. The application further provides a planar drive system.

19 Claims, 9 Drawing Sheets

(51) Int. Cl.

| | |
|---|---|
| ***B01F 31/20*** | (2022.01) |
| ***B01F 31/22*** | (2022.01) |
| ***B01F 35/213*** | (2022.01) |
| ***B65G 11/02*** | (2006.01) |
| ***H02K 1/12*** | (2006.01) |
| ***H02K 1/27*** | (2022.01) |

(52) U.S. Cl.

CPC .......... *B01F 35/213* (2022.01); *B65G 11/023* (2013.01); *H02K 1/12* (2013.01); *H02K 1/27* (2013.01)

(58) Field of Classification Search

CPC ...... B65G 47/1492; B65G 54/02; H02K 1/12; H02K 1/27; H02K 2201/18; H02K 33/16; H02K 41/031

See application file for complete search history.

(56) References Cited

U.S. PATENT DOCUMENTS

| | | | | |
|---|---|---|---|---|
| 9,126,200 | B2 | 9/2015 | Simmat et al. | |
| 9,878,813 | B2 | 1/2018 | Eberhardt et al. | |
| 10,116,195 | B2* | 10/2018 | Lu .......................... | H02N 15/00 |
| 10,584,001 | B2 | 3/2020 | Philipp et al. | |
| 10,914,418 | B2 | 2/2021 | Wang et al. | |
| 2012/0128459 | A1 | 5/2012 | Hoyer et al. | |
| 2019/0152724 | A1 | 5/2019 | Philipp et al. | |
| 2021/0331878 | A1* | 10/2021 | Hauer .................... | H02K 41/02 |
| 2022/0055842 | A1* | 2/2022 | Nickel ................... | B65G 54/02 |
| 2022/0134295 | A1* | 5/2022 | Herzog .................. | B01F 31/22<br>700/280 |

FOREIGN PATENT DOCUMENTS

| | | | | |
|---|---|---|---|---|
| DE | 19945584 | A1 | 3/2001 | |
| DE | 102009013778 | A1 | 9/2010 | |
| DE | 102014214696 | A1 | 1/2016 | |
| DE | 102016205513 | A1 | 10/2017 | |
| DE | 102017003120 | A1 | 10/2018 | |
| DE | 102020127012 | A1 | 4/2022 | |
| EP | 1357429 | A1 | 10/2003 | |
| EP | 1443632 | A2 * | 8/2004 | ........... H02K 41/031 |
| EP | 2443632 | A2 | 8/2004 | |
| EP | 2393739 | B1 | 12/2012 | |
| WO | 0121296 | A1 | 3/2001 | |

OTHER PUBLICATIONS

International Preliminary Report on Patentability dated Feb. 1, 2023 in connection with International Patent Application No. PCT/EP2021/078245, 38 pages including English translation.

Office Action dated Jun. 30, 2021 in connection with German patent application No. DE 10 2020 127 012.7, 9 pages including English translation.

Office Action dated Jul. 4, 2023 in connection with German patent application No. 21790881.3, 14 pages including English translation.

Office Action dated Dec. 29, 2023 in connection with Chinese Patent Application No. 202180070011.5, 8 pages including English translation.

* cited by examiner

METHOD FOR CONTROLLING A PLANAR DRIVE SYSTEM AND PLANAR DRIVE SYSTEM

CROSS-REFERENCE TO RELATED APPLICATIONS

This patent application is a continuation of International Patent Application No. PCT/EP2021/078245, filed 13 Oct. 2021, METHOD FOR CONTROLLING A PLANAR DRIVE SYSTEM AND PLANAR DRIVE SYSTEM, which claims the priority of German patent application DE 10 2020 127 012.7, filed 14 Oct. 2020, VERFAHREN ZUM STEUERN EINES PLANARANTRIEBSSYSTEMS UND PLANARANTRIEBSSYSTEM, each of which is incorporated by reference herein, in the entirety and for all purposes.

FIELD

The invention relates to a method for controlling a planar drive system, and to a planar drive system set up to carry out the method for controlling a planar drive system.

BACKGROUND

Planar drive systems may be used, among other things, in automation technology, in particular manufacturing technology, handling technology and process engineering. Planar drive systems may be used to move or position a moving element of a system or machine in at least two linearly independent directions.

Planar drive systems may comprise a permanently energized electromagnetic planar motor having a planar stator and a rotor movable on the stator in at least two directions.

In a permanently energized electromagnetic planar motor, a driving force is exerted on the rotor by current-carrying conductors magnetically interacting with drive magnets of a magnet assembly. The invention relates in particular to embodiments of planar drive systems in which the drive magnets of an electric planar motor are arranged on the rotor and the current-carrying conductors of the planar motor are arranged in a stationary planar stator.

In such a drive system, the rotor comprises at least a first magnet unit for driving the rotor in a first direction and a second magnet unit for driving the rotor in a second direction linearly independent of the first direction, for example in a direction orthogonal to the first direction. The planar stator comprises at least a group of first energizable conductors magnetically interacting with the magnets of the first magnet unit to drive the rotor in the first direction, and a group of second energizable conductors magnetically interacting with the magnets of the second magnet unit to drive the rotor in the second direction. The first and second groups of conductors are generally independently energizable to allow independent movement of the rotor in the first and second directions. If the conductors of the first and second groups themselves may be energized independently of one another at least in parts, a plurality of rotors may be moved independently of one another on one stator at the same time.

The planar drive system thus allows a rotor to move along any path between a starting point and an end point. This allows a maximum degree of flexibility by not restricting the movement to predefined paths.

Planar drive systems are thus optimally set up for the transport of objects, e.g. within a production process in which components of a product to be processed must be transported between individual processing stations. Such a transport requires loading and unloading of the objects to be transported onto the respective transport medium used in loading and unloading stations. In such processes, it is often advantageous if the object to be transported is arranged in a specific position or orientation on the transport medium, as this simplifies unloading in further method steps.

This usually requires a complicated and time-consuming reorientation or sorting of the transported object(s) with the corresponding devices set up for this purpose. On the one hand, this delays the transport process, since the object or objects have to be reoriented or sorted either before or after transport. On the other hand, the complexity of the transport system is increased, since an additional component in the form of a correspondingly embodied orientation/sorting device or a plurality of corresponding devices is required.

In addition, depending on the type of objects to be transported, different orientation/sorting devices are required, each of which is set up to orient or sort one type of object but may be unsuitable for objects of a different type.

SUMMARY

The application provides a method for controlling a planar drive system which, due to an improved control of a rotor, allows for an improved and simplified transport of objects to be transported. It is a further object of the invention to provide a planar drive system which is arranged to carry out the method according to the invention.

EXAMPLES

A method for controlling a planar drive system is provided, where the planar drive system comprises at least one controller, a stator module having a stator surface, and a rotor that may be positioned and movable on the stator surface, where magnetic coupling is achievable between a rotor magnetic field of the rotor and stator magnetic fields that may be generated by the stator module, and where movement of the rotor relative to the stator module is allowed for via selective control of the stator magnetic fields. The method comprises:

- positioning an object on a rotor in a first arrangement state of the object in a positioning step;
- carrying out an accelerating movement of a defined movement pattern of the rotor and by the accelerating movement arranging the object positioned on the rotor in the first arrangement state in a second arrangement state in an arranging step, where the accelerating movement of the rotor is achieved by driving the stator magnetic fields accordingly,
- wherein the movement pattern comprises at least an acceleration pulse having an acceleration strength and an acceleration duration in an acceleration direction, where the movement pattern comprises an accelerated translational movement in a translational acceleration direction and/or an accelerated rotational movement about a rotational axis, and where the translational acceleration direction and/or the rotational axis are oriented in an arbitrary spatial direction.

This may achieve the technical advantage that an improved method for controlling a planar drive system may be provided which enables a change of an arrangement state of an object positioned on a rotor of the planar drive system during a transport operation of the object. This change of the arrangement state of the object to be transported may particularly be achieved without using an additional device for changing the arrangement state exclusively by controlling the rotor accordingly.

For this purpose, the rotor is driven to carry out an accelerating movement according to a defined movement pattern, so that an arrangement state of an object positioned on the rotor is changed by the accelerating movement of the rotor. The accelerating movement of the rotor is in this context caused by corresponding control of the stator magnetic fields of the stator module of the planar drive system. The respective movement pattern according to which the accelerating movement is executed comprises here an accelerated translational movement along a translational acceleration direction and/or an accelerated rotational movement about a rotational axis. The accelerated translational movement or the accelerated rotational movement comprises at least an acceleration pulse with an acceleration strength and an acceleration duration in an acceleration direction.

By the jerky acceleration in the form of the acceleration pulse, a current arrangement state of the object on the rotor may be changed to a desired arrangement state, in that due to the inertial mass of the object arranged unattached on the rotor as a result of the jerky acceleration of the rotor, the object is driven to carry out a relative movement relative to the rotor, causing a change in the arrangement state. By braking the rotor, by which the accelerated translational movement or the accelerated rotational movement of the rotor is braked, a positioning of the object in the changed arrangement state on the rotor may be achieved.

Subsequently, the object may be processed in the changed arrangement state, e.g. it may be unloaded from the carriage or positioned on the carriage in the changed arrangement.

BRIEF DESCRIPTION OF THE DRAWINGS

The invention is described in more detail with reference to the accompanying figures, which show.

DETAILED DESCRIPTION

Figure 1:
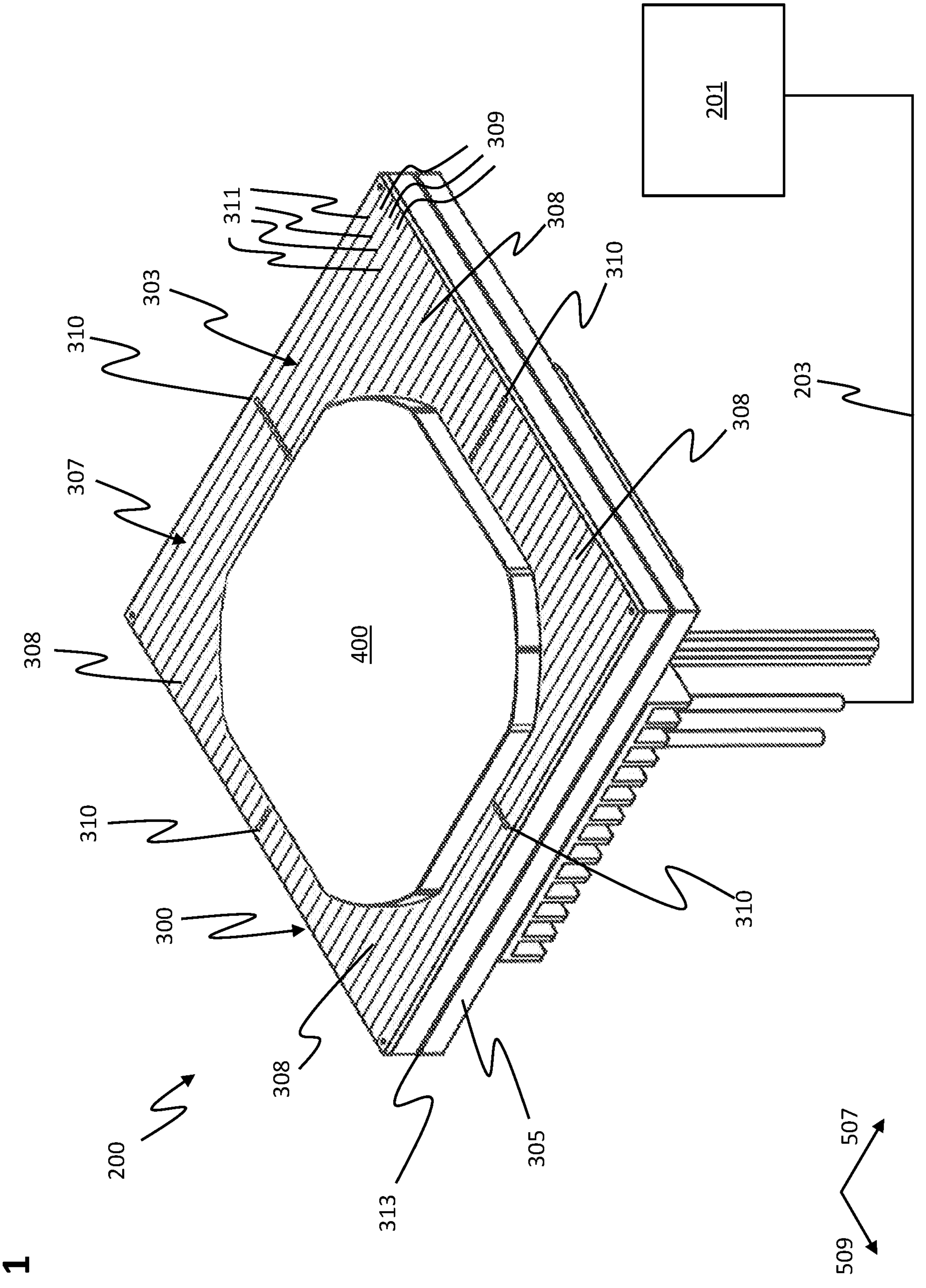
FIG. 1 is a schematic depiction of a planar drive system having a stator module and a rotor according to an embodiment.

For the purposes of the application, an object is an object or a plurality of objects which are to be brought into a different arrangement state by application of the method. The object may be a three-dimensional solid object and e.g. a product or partial product of a production process or a processing process or a transport process. In addition, the object may be liquid or powdery or granular and it may be arranged within a container.

For the purposes of the application, a jerky acceleration in the form of an acceleration pulse is a brief sudden acceleration with a defined acceleration strength and a defined acceleration duration in the form of a pulse width of the acceleration pulse. For the purposes of the application, an acceleration strength is a value of a change in velocity of the moving rotor.

For purposes of the application, an arrangement state describes an orientation of the object positioned on the rotor relative to the rotor. Depending on the particular object, an arrangement state may comprise an orientation and/or alignment of the object relative to the rotor. Furthermore, an arrangement state may comprise a degree of ordering or sorting of a plurality of objects or items relative to one another. Additionally, an arrangement state may comprise a degree of mixing/state or a degree of de-mixing/state or a degree of dissolution/state, respectively, of a granular, powdery, or liquid object having at least two components.

A planar drive system comprising at least a controller, a stator module having a stator surface and a rotor that may be positioned on the stator surface are provided, where a magnetic coupling is achievable between a rotor magnetic field of the rotor and stator magnetic fields that may be generated by the stator module, where a movement of the rotor relative to the stator module is enabled via a targeted control of the stator magnetic fields, and where the planar drive system is embodied to carry out the method according to the invention.

This may achieve the technical advantage that a planar drive system may be provided which may carry out the method according to the invention with the advantages mentioned.

According to an embodiment, the movement pattern comprises a superposition of a plurality of accelerated translational movements in differently oriented translational acceleration directions and/or a plurality of accelerated rotational movements about different rotational axes.

This may achieve the technical advantage that an accelerating movement having any kind of complex movement pattern consisting of a plurality of superimposed accelerated translational movements and/or of a plurality of accelerated rotational movements may be obtained. Depending on the type of object and of the respective arrangement state, a corresponding movement pattern may thus be generated which is suitable for transferring the object to the respective preferred arrangement state.

According to an embodiment, the movement pattern comprises an oscillatory movement pattern with temporally successive acceleration pulses in oppositely oriented acceleration directions, where the movement pattern has a variable frequency and/or amplitude and/or pulse width of the temporally successive acceleration pulses.

This may achieve the technical advantage that by applying the oscillatory movement pattern, a shaking or stirring function of the rotor may be obtained. By applying the oscillatory movement pattern e.g. consisting exclusively of accelerated translational movements, a shaking function may be generated in which the rotor is moved back and forth along one or more translational acceleration directions, thereby shaking an object arranged on the rotor back and forth. Through this, a sorting function of an object consisting of a plurality of objects or a compacting function of an object embodied as bulk material may be achieved. Furthermore, the oscillatory movement pattern, which e.g. exclusively comprises an accelerated rotational movement about a rotational axis, may achieve a stirring function or mixing-de-mixing function of an object embodied as a fluid, in that the object arranged in a container may be mixed or demixed by rotating the rotor back and forth about the rotational axis.

Oscillatory movement patterns having acceleration pulses of varying acceleration duration may further be used to effectively move the rotor relative to the stator module, in which the oscillatorily accelerated movement positions the rotor in a position on the stator module that is different after the movement is complete than it was before the movement began.

As an alternative, combinations of accelerated translational and accelerated rotational movements of the rotor are possible.

According to an embodiment, the movement pattern is a movement pattern that may be individually adjusted to the object to be arranged, where a translation acceleration direction and/or a rotational axis and/or a number of successive acceleration pulses and/or a frequency and/or an acceleration strength of the acceleration pulses and/or an acceleration duration of the acceleration pulses and/or an execution duration of the movement pattern may be adjusted, or a predefined movement pattern of a plurality of predefined movement patterns stored in a database with predefined translation acceleration direction and/or with predefined rotational axis and/or with predefined number of successive acceleration pulses and/or with predefined frequency and/or with predefined acceleration strength of the acceleration pulses and/or with predefined acceleration duration of the acceleration pulses and/or with predefined execution duration of the movement pattern.

This may achieve the technical advantage that a flexible design of the movement pattern is possible. Depending on the type of object or the respective arrangement states, the movement pattern used may be individually adjusted in order to generate an optimum movement pattern that is set up to bring the object positioned on the rotor into the desired arrangement state. Maximum flexibility is achieved in this way. For this purpose, in particular a translation acceleration direction and/or an orientation of a rotational axis and/or a number of successive acceleration pulses and/or a frequency and/or an acceleration strength of the acceleration pulses and/or an acceleration duration of the acceleration pulses and/or an execution duration of the movement pattern may be adjusted.

As an alternative, a predetermined movement pattern may be used to place the object in the second arrangement state. This may simplify the method for controlling the planar drive system by relying on predefined movement patterns. The predefined movement patterns may be classified for certain types of objects and/or arrangement states. Depending on the type of object to be transported in each case and/or depending on the second arrangement state to be achieved in each case and/or on the first arrangement state of the object present in each case, a suitable predefined movement pattern may be selected from a plurality of different movement patterns, which is suitable in each case for moving an object of a particular type from a particular present first arrangement state into a particular desired second arrangement state. In this context, the movement patterns may have predefined translation acceleration directions and/or predefined oriented rotational axes and/or predefined numbers of successive acceleration pulses and/or predefined frequencies of the oscillatory movement patterns and/or predefined acceleration strengths of the acceleration pulses and/or predefined acceleration durations of the acceleration pulses and/or predefined execution durations of the movement pattern.

According to an embodiment, the movement pattern further comprises a braking movement, where the braking movement comprises an acceleration direction opposite to the acceleration direction of the acceleration pulse, where the braking movement has a lower acceleration strength and/or a greater acceleration duration and/or a smaller acceleration change over time than the acceleration pulse, and where the braking movement moves the rotor to an initial position of the rotor prior to the start of the accelerating movement.

This may achieve the technical advantage that the braking movement, which has a flat course and a small change in acceleration over time compared to the acceleration pulse, may terminate the relative movement of the object relative to the rotor and thus position the object in the second arrangement state on the rotor without the braking movement causing a renewed change in the arrangement state of the object. By moving the rotor back to the initial position in which the rotor was positioned before the accelerating movement was executed, it may be achieved that the accelerating movement of the rotor, which primarily serves to change the arrangement state of the object on the rotor, does not effectively cause the rotor to move between two positions on the stator module.

According to an embodiment, the method further comprises moving the rotor from a first position of the rotor relative to the stator module into a second position of the rotor relative to the stator module and transporting the object arranged on the rotor in a transporting step, where the accelerating movement is performed simultaneously with the moving of the rotor.

This may have the technical advantage that during the transport process of the object between the loading and unloading positions, the object positioned on the carriage may be set to the desired arrangement state. In this way, the transport process may be accelerated in that the object may be unloaded or processed in the desired arrangement state immediately upon reaching the unloading position or the processing position.

According to an embodiment, the method further comprises unloading the object in the second arrangement state of the rotor in the second position of the rotor relative to the stator module in an unloading step.

This may achieve the technical advantage that the change in the arrangement state of the object on the carriage may be integrated into a transport process, so that during transport the arrangement state may be changed in such a way that the object may be unloaded in the desired arrangement state. Alternatively to unloading the object, the object may also be processed in the changed second arrangement state.

According to an embodiment, the method further comprises:

- determining a type of object, a first arrangement state of the object and a second arrangement state of the object to be achieved in a first determining step, where the type of object comprises a size, a shape, a mass, a form, a bulk property, a liquid property, a degree of mixing and a degree of dissolution, where the first arrangement state and the second arrangement state comprise, depending on the type of object, a positioning and/or orientation relative to the rotor, a degree of compaction, a degree of mixing, a degree of de-mixing, a degree of dissolution, of the object and
- selecting a movement pattern from a list of possible movement patterns, the movement pattern defining a translational acceleration direction and/or a rotational axis and/or a number of successive acceleration pulses and/or a frequency and/or an acceleration strength of the acceleration pulses and/or an acceleration duration of the acceleration pulses and/or an execution duration of the movement pattern, which is or are suitable for arranging the object from the first arrangement state to the second arrangement state, in a movement pattern selecting step.

This may achieve the technical advantage that a movement pattern may be individually adjusted to the respective object. This means that an ideal movement pattern may be selected that is suitable for bringing the object into the desired second arrangement state. For this purpose, the type of object or the first and second arrangement states may first be determined. In this context, the type of object may comprise a size, a shape, a mass, a form, a bulk property, a liquid property, a degree of mixing, or a degree of dissolution.

Since the object may be formed both as a single three-dimensional object or as a plurality of three-dimensional objects, e.g. individual components, or also as a bulk material or a liquid, different movement patterns, which are suitable in each case for bringing the respective object into a modified arrangement state, have different characteristics. Thus, depending on the mass of the object positioned on the rotor, a higher or lower acceleration strength may be selected in order to be able to bring about a change in the respective arrangement state. At the same time, the choice of the movement pattern used may take into account whether the object to be transported is formed in each case as one object or as a plurality of loose or interconnected objects.

Furthermore, a shape of the object(s) as well as other material properties may be considered for selecting the appropriate movement pattern. The same applies to an object that is formed as a bulk material or fluid. If necessary, these properties may also be taken into account when selecting the suitable movement pattern. The selected movement pattern may thereby define a translational acceleration direction and/or an orientation of a rotational axis and/or a number of successive acceleration pulses and/or a frequency and/or an acceleration strength of the acceleration pulses and/or an acceleration duration of the acceleration pulses and/or an execution duration of the movement pattern, which is or are suitable in each case for arranging the object from the first to the second arrangement state.

Depending on the respective type of object, the arrangement states that the respective object may assume on the rotor may differ. For example, for an object that is embodied as a three-dimensional object or as a plurality of three-dimensional objects or components or parts, an arrangement state may comprise a position and an orientation or alignment of the object relative to the rotor. Furthermore, an arrangement state may take into account an order between the individual objects. Different arrangement states may differ in the respective position or orientation that the respective object occupies on the rotor.

As an alternative, different arrangement states may describe different orders between the individual objects. For an object embodied as bulk material, which is arranged on the rotor filled into a container, an arrangement state may comprise a degree of compaction or a degree of mixing or de-mixing. Different arrangement states may e.g. describe a filling of the container with the respective bulk material having different compaction, or in the case of a bulk material with a plurality of components or components, a mixing or separation of the individual components. The same applies to liquids, for which different arrangement states may describe a different degree of mixing or separation or dissolution of individual components of the liquid.

After determining the type of object or the individual arrangement states, the appropriate movement pattern may be selected from a number of movement patterns provided. The individual movement patterns may e.g. be set up to move an object of a specific size, shape and mass to a specific position and orientation on the carriage. At the same time, further movement patterns may be set up to mix or separate individual components of a bulk material, or to compact a bulk material within a container, or to dissolve a component in a liquid. As a result, the widest possible range of application of the method according to the invention may be provided, where the method has corresponding orientation, sorting, positioning, compacting, mixing, de-mixing, dissolving or portioning functions.

According to an embodiment, the arranging step comprises:

- monitoring the object during the arranging step and detecting an arrangement state of the object in a first detecting step;
- adjusting the execution of the accelerating movement in the arranging step on the basis of the detected arrangement state in an adjusting step, where adjusting comprises continuing the execution of the accelerating movement, modifying the acceleration strength and/or the acceleration direction, or modifying the movement pattern, where adjusting the execution of the accelerating movement comprises adjusting the movement pattern or executing a further movement pattern; and/or
- monitoring the object during the arranging step and detecting the object in the second arranging state and terminating the accelerating movement in a detecting step.

This may achieve the technical advantage that a most efficient change of the arrangement state of the object positioned on the rotor may be achieved. For this purpose, the result of the executed accelerating movement on the respective object positioned on the rotor may be monitored and a continuation or termination or adjustment of the respectively executed accelerating movement may be assessed on the basis of the effect achieved. By monitoring the object during the execution of the accelerating movement, the respective arrangement state of the object may be determined and, on the basis thereof, the respective accelerating movement may be continued if the targeted arrangement state has not been reached, or the respective accelerating movement may be ended if the targeted arrangement state has been reached.

As an alternative, the respective movement pattern may be adjusted if the movement pattern used does not lead to any recognizable success. An adjustment of the movement pattern may comprise an adjustment of the translational acceleration direction and/or the orientation of the rotational axis and/or the number of successive acceleration pulses and/or the frequency of the movement pattern and/or the acceleration strength of the acceleration pulses and/or the acceleration duration of the acceleration pulses and/or the execution duration of the movement pattern. Alternatively or additionally, an adjustment of the movement pattern may comprise alternating between an accelerated translational movement and a rotational movement.

Alternatively or additionally, an adjustment of the movement pattern may comprise a superposition of a plurality of accelerated translational and/or rotational movements. As an alternative, an adjustment of the movement pattern may comprise a change to or from an oscillatory movement pattern.

According to an embodiment, determining the type of object in the determining step and/or selecting the movement pattern in the movement pattern selecting step and/or detecting the arrangement state in the first detecting step and/or adjusting the movement pattern in the adjusting step and/or detecting the object in the second arrangement state in the second detecting step is carried out by a correspondingly trained neural network or by a plurality of correspondingly trained neural networks.

This may achieve the technical advantage that determining the type of object in the determining step and/or selecting the movement pattern in the movement pattern selecting step and/or detecting the arrangement state in the first detecting step and/or adjusting the movement pattern in the adjusting step and/or detecting the object in the second arrangement state in the second detecting step may be performed precisely and automatically.

According to an embodiment, the first detecting step and/or the second detecting step comprise:

- determining a magnetic force which is required to hold the rotor in a floating position above the stator surface of the stator module with the aid of the magnetic coupling between the rotor magnetic field and the stator magnetic field, and/or which is required to accelerate and/or decelerate the rotor in the accelerating movement with the aid of the magnetic coupling between the rotor magnetic field and the stator magnetic field, and/or which is required to move the rotor with the aid of the magnetic coupling between the rotor magnetic field and the stator magnetic field, in a force detecting step; and
- determining the first arrangement state and/or the second arrangement state, taking into account the required magnetic force.

This may achieve the technical advantage that the monitoring of the object positioned on the rotor during the execution of the accelerating movement may be carried out via the stator module used to drive the rotor and thus no additional device is required.

For this purpose, a center of gravity measurement may be performed by the stator module, based on which an arrangement state of the object on the rotor may be determined. To carry out the center of gravity measurement, a magnetic force may be determined that must be applied by the stator module to keep the rotor, including the object positioned on the rotor, in a floating state above the stator module. Depending on the positioning of the object on the rotor, the center of gravity of the rotor changes, which results in a modified magnetic force being applied by the stator module to maintain the floating state. This may be used to determine a change in the arrangement state depending on the type of object positioned on the rotor.

As an alternative, a positioning or orientation of the object positioned on the rotor may be determined by the stator module for carrying out the accelerating movement or a magnetic force required for moving the rotor, since in this context, as well, a modified magnetic force must be applied by the stator module depending on the positioning or orientation for carrying out a corresponding movement of the rotor.

In particular, a magnetic force may comprise a 1-dimensional or 2-dimensional or 3-dimensional distribution of force.

According to an embodiment, the first detecting step and/or the second detecting step comprise monitoring the object on the rotor via a monitoring device in a monitoring step, where the monitoring device is embodied as an optical monitoring device or as an acoustic monitoring device or as an electromagnetic monitoring device and is set up to determine an arrangement state of the object by receiving corresponding optical or acoustic or electromagnetic measurement signals.

This has the technical advantage that precise monitoring of an object positioned on the rotor and, in particular, determining the respective arrangement state may be achieved. Monitoring with the aid of an optical or acoustic monitoring device allows for detecting the object positioned on the rotor at any time and for determining a current arrangement state. The optical or acoustic or electromagnetic monitoring devices may comprise any solutions known from the state of the art that are suitable for monitoring objects.

According to an embodiment, the object comprises one or a plurality of components, where an arrangement state of the object comprises a position of each of the components on the rotor and/or an orientation of each component relative to the rotor, where two positions of a component on the rotor are convertible into each other by a translational movement of the component on the rotor, and where two orientations of a component relative to the rotor are convertible into each other by a rotation of the component about a rotational axis.

This may achieve the technical advantage that the method according to the invention may be used for arranging or orienting or portioning three-dimensional objects, which are e.g. embodied as components or manufactured products.

According to an embodiment, the object comprises a bulk material filled in a container, where an arrangement state of the object comprises filling the bulk material in the container with a certain filling density.

This may achieve the technical advantage that the method according to the invention may be used for compacting an object embodied as bulk material.

According to an embodiment, the object comprises a bulk material and/or fluid filled into a container having at least two components, where an arrangement state of the object comprises filling the bulk material or fluid in the container with a certain mixing or de-mixing of the at least two components.

This may achieve the technical advantage that the method according to the invention may be used for mixing or de-mixing an object formed as a bulk material having at least two components or an object formed as a fluid having at least two components.

A use of the method of the invention is provided for sorting a plurality of components into a sorting device provided for this purpose by positioning the sorting device and the components on a rotor and carrying out the accelerating movement of the rotor, where the sorting device comprises at least one receiving opening suitable to receive at least one component.

This may provide the technical advantage of providing a sorting function for a plurality of three-dimensional components, products or objects.

A use of the method is provided for compacting or loosening a bulk material in a container provided for receiving the bulk material by positioning the container filled with the bulk material on a rotor and carrying out the accelerating movement of the rotor.

This may provide the technical advantage of providing a compacting/loosening function of a bulk material.

As an alternative, the container may be mounted on the rotor and the container positioned on the rotor may be filled with the bulk material.

A use of the method is provided for mixing a bulk material having at least two components in a container provided for receiving the bulk material by positioning the container filled with the bulk material on a rotor and carrying out the accelerating movement of the rotor.

This may achieve the technical advantage that a mixing function of a bulk material having at least two components or components may be provided.

As an alternative, the container may be mounted on the rotor and the container positioned on the rotor may be filled with the bulk material.

A use of the method is provided for de-mixing a bulk material having at least two components and separating the at least two components into respective containers provided for receiving the bulk material by positioning the container filled with the bulk material on a rotor and carrying out accelerating movement of the rotor, where the container further comprises a filter element.

This may achieve the technical advantage that a de-mixing/separating function of a bulk material having at least two components or components may be provided.

As an alternative, the container may be mounted on the rotor and the container positioned on the rotor may be filled with the bulk material.

A use of the method is provided for mixing a fluid having at least two components in a container provided for holding the fluid by positioning the container filled with the fluid on a rotor and carrying out the accelerating movement of the rotor.

As an alternative, the container may be mounted on the rotor and the container positioned on the rotor may be filled with the fluid.

This may achieve the technical advantage that a mixing function of a fluid with at least two components or components may be provided.

A use of the method is provided for dissolving a solid component in a fluid in a container provided for holding the fluid by positioning the container filled with the fluid on a rotor and carrying out the accelerating movement of the rotor.

As an alternative, the container may be mounted on the rotor and the container positioned on the rotor may be filled with the fluid.

The technical advantage of this is that a solution function of a fluid with at least two components or components may be provided.

A use of the method is provided for portioning a portionable object by positioning a container filled with a portionable object having a portioning device on the rotor and carrying out accelerating movement of the rotor.

This may provide the technical advantage of providing a portioning function of a portionable object.

As an alternative, the container may be attached to the rotor and the container positioned on the rotor may be filled with the object to be portioned.

A portionable object may be an object comprising a plurality of three-dimensional components or products.

A use of the method is provided for deburring an object by positioning a container filled with the object to be deburred on the rotor and carrying out the accelerating movement of the rotor.

This has the technical advantage that deburring of objects may be achieved by moving them back and forth in the container and thus deburring them by contact with the container inner wall.

As an alternative, the container may be mounted on the rotor and the container positioned on the rotor may be filled with the object to be deburred.

FIG. 1 shows a schematic view of a planar drive system 200 with a stator module 300 and a rotor 400.

According to the embodiment in FIG. 1, the planar drive system comprises a controller 201, a stator module 300, and a rotor 400. The controller 201 is connected to the stator module 300 via a data link 203. The controller 201 is set up to carry out a method 100 according to the application for controlling a planar drive system 200.

For a detailed description of the method according to the application for controlling a planar drive system 200, reference is made to the description for FIG. 4 to FIG. 11.

The stator module 300 has a planar stator surface 303. The planar stator surface 303 is arranged at an upper surface of a stator module housing 305. A rotor 400 is arranged above the stator surface 303. The stator surface 303 is part of a stator assembly 307 for an electric drive of the rotor 400. The stator assembly 307 comprising the stator surface 303 may be a printed circuit board. The stator surface 303 is square in shape.

The stator assembly 307 comprises four stator segments 308 that are connected to electronic modules inside the stator module housing 305 via a contact structure 310.

The rotor 400 may be driven above the stator surface 303 in at least a first direction 507 and a second direction 509. The stator surface 303 comprises a plurality of stator conductors 309, which in the embodiment shown in FIG. 1 are embodied as stator conductors 309, and which are substantially aligned along the first direction 507. The stator conductors 309 are embodied to conduct current, and stator magnetic fields may be generated via a current applied to the stator conductors 309 to drive the rotor 400. Via a magnetic coupling between the stator magnetic fields and a rotor magnetic field of the rotor 400, the rotor 400 may be moved along the stator surface 301 by suitably varying the stator magnetic fields with the aid of a corresponding control by the controller 201.

Below the stator surface 303, another arrangement of stator conductors may be provided in which the stator conductors are substantially aligned along the second direction 509.

The stator module housing 305 may further comprise electronic modules for driving and controlling the rotor 400.

Figure 2:
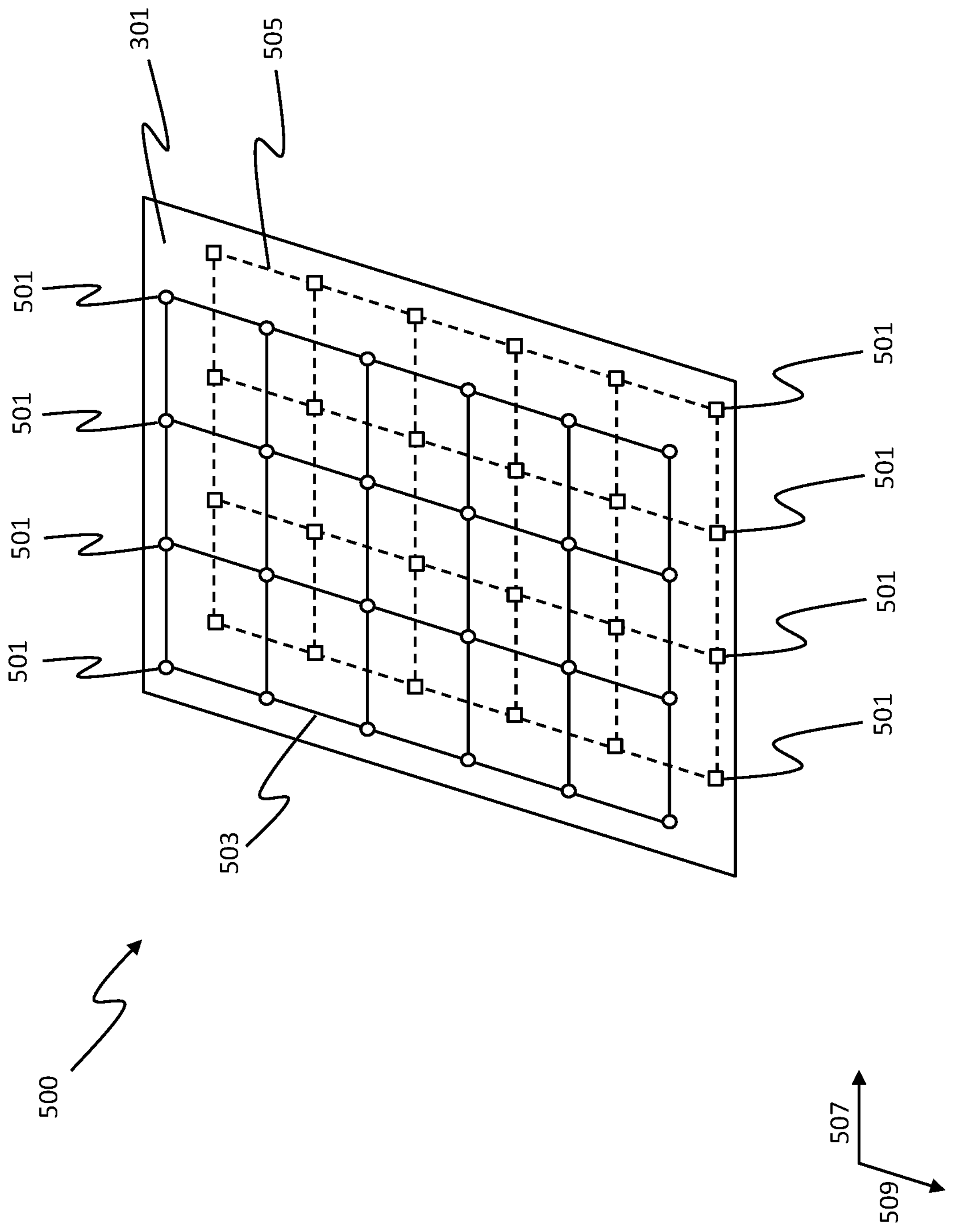
FIG. 2 is a schematic perspective view of a sensor module of the stator module according to an embodiment.

FIG. 2 shows a perspective view of a sensor module 500 for detecting a position of the rotor 400 in the planar drive system 200.

In the embodiment shown, the sensor module 500 is embodied rectangularly and has a two-dimensional array of magnetic field sensors 501 on a carrier 301 of the stator module 300. The magnetic field sensors 501 are arranged on the carrier 301 within the stator module 300.

In the embodiment shown, the two-dimensional array of magnetic field sensors 501 comprises a first periodic grid 503 of magnetic field sensors 501 and a second periodic grid 505 of magnetic field sensors 501.

The arrangement of magnetic field sensors 501 shown in FIG. 2 is for illustrative purposes only and may differ from the arrangement shown in FIG. 2.

The magnetic field sensors 501 may be embodied as Hall sensors. In particular, the magnetic field sensors 501 may be embodied as 2D or 3D Hall sensors, where 3D Hall sensors measure the magnetic field components in three linearly independent spatial directions. In particular, these spatial directions may comprise the first direction 507 and the second direction 509 as well as a third direction perpendicular to the first direction 507 and the second direction 509.

A rotor magnetic field of a rotor 400 positioned on the stator module 300 may thus be precisely detected via the magnetic field sensors 501, each of which is set up to carry out magnetic field determinations for predefined spatial regions. Precise detection of a rotor magnetic field of a rotor positioned or moving on the stator module 300 allows for determining the position of the rotor 400 relative to the stator module 300, which in turn allows for precisely controlling the rotor 400.

Figure 3:
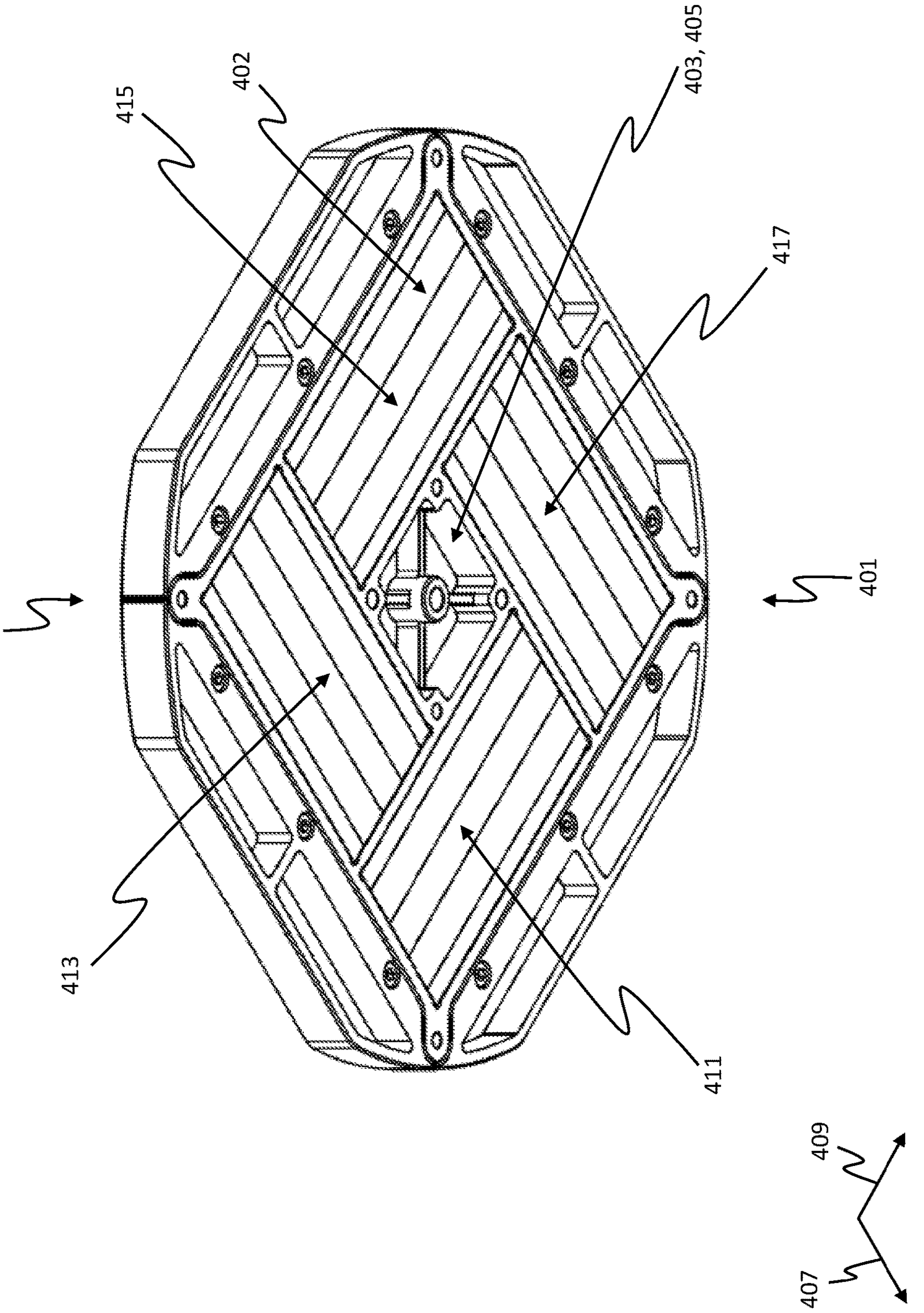
FIG. 3 is a schematic depiction of a bottom side of a rotor according to an embodiment.

FIG. 3 shows the rotor 400 of the planar drive system 200 in a bottom view of an underside of the rotor 400. In operation of the planar drive system 200, the underside of the rotor 400 faces the stator surface 303 of the stator module 300. The rotor 400 comprises a magnet assembly 401 on the underside comprising a first magnet unit 411, a second magnet unit 413, a third magnet unit 415, and a fourth magnet unit 417. The magnet assembly 401 is embodied to generate the rotor magnetic field of the rotor 400, via which a magnetic coupling with the stator magnetic fields of the stator module 300 may be achieved. Via the magnetic coupling, a control of a movement of the rotor 400 relative to the stator module 300 may be achieved.

In operation, the bottom surface of the rotor 400 with the magnet assembly 401 is oriented substantially in parallel to the stator surface 303 and facing the stator surface 303.

In the embodiment shown, the first magnet unit 411 and the third magnet unit 415 are each oriented in parallel with regard to a second rotor direction 409 while the second magnet unit 413 and the fourth magnet unit 417 are oriented along a first rotor direction 407. In operation, the first and third magnet units 411, 415 serve to drive the rotor 400 in the first rotor direction 407, and the second and fourth magnet units 413, 417 serve to drive the rotor 400 in the second rotor direction 409. In addition, all of the magnet units 413, 417 serve to drive in a direction perpendicular to the stator surface 303.

In the center of the magnet assembly 401, the rotor 400 may have a free surface 403 that is not covered by magnets of the magnet assembly 401. In the area of the free surface 403, the rotor 400 may have a mounting structure 405.

Figure 4:
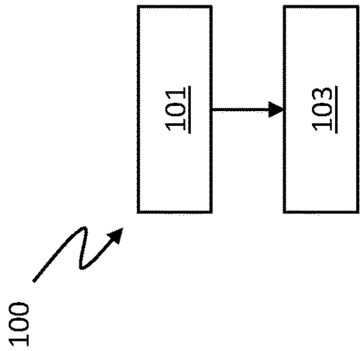
FIG. 4 is a flowchart of a method for controlling a planar drive system according to an embodiment.

FIG. 4 shows a flowchart of the method 100 for controlling a planar drive system 200 according to an embodiment.

Figure 6:
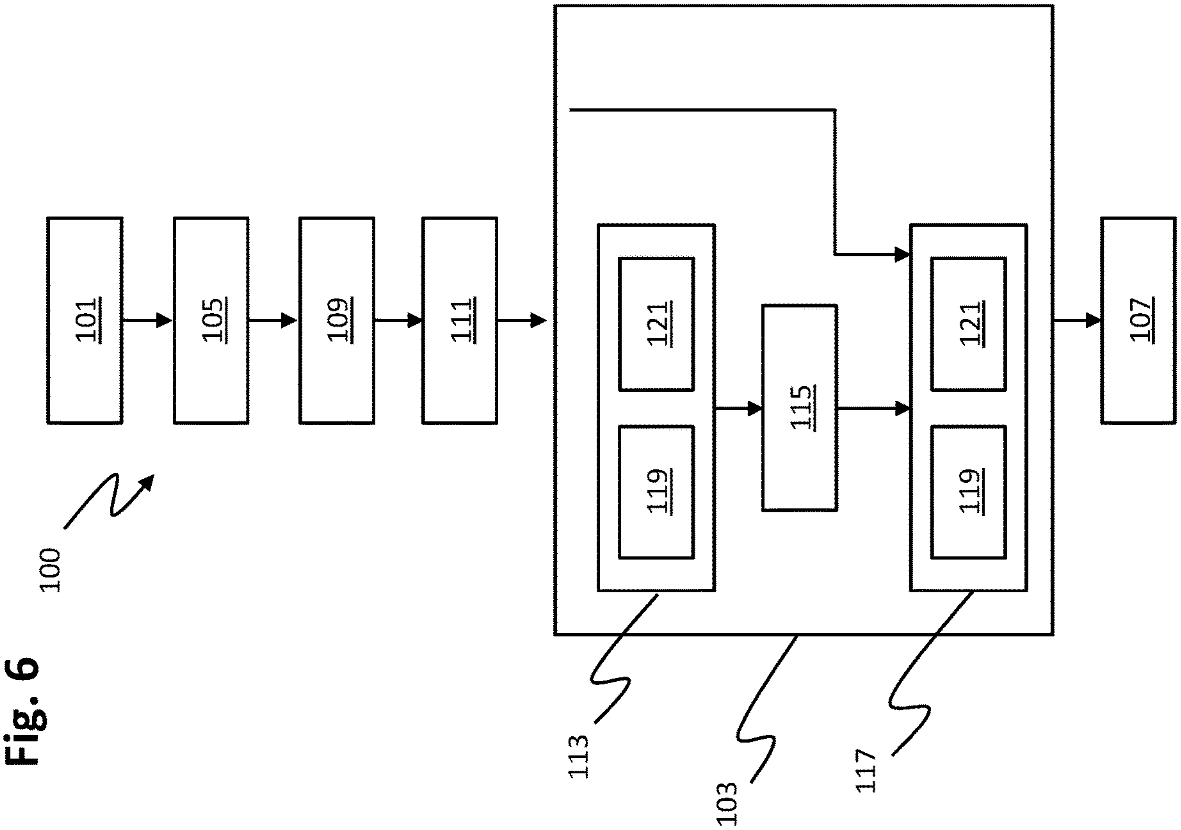
FIG. 6 is a further flowchart of the method for controlling a planar drive system according to a further embodiment.
Figure 5:
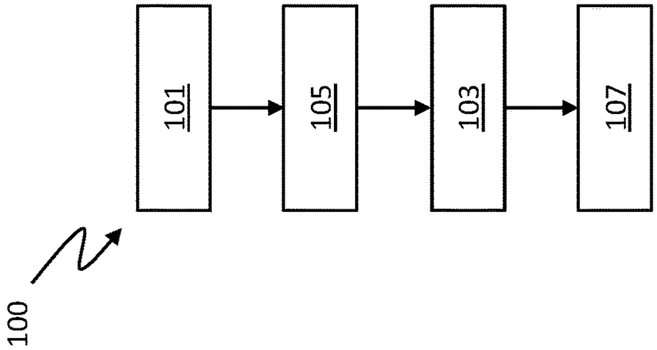
FIG. 5 is a further flowchart of the method for controlling a planar drive system according to a further embodiment.

The method 100 shown in FIGS. 4 to 6 is carried out with reference to the description of FIGS. 7 to 11.

The method 100 for controlling a planar drive system 200 according to the embodiment in FIG. 4 is applicable to a planar drive system 200 according to any one of FIGS. 1 to 3, where the planar drive system 200 comprises at least a controller 201, a stator module 300 having a stator surface 303, and a rotor 400 that may be positioned and moved on the stator surface 303.

Furthermore, a magnetic coupling may be achieved between a rotor magnetic field of the rotor 400 and stator magnetic fields that may be generated by the stator module 300, via which a movement of the rotor 400 relative to the stator module is made possible by a targeted control of the stator magnetic fields.

In order to control the rotor 400 according to the method 100, a positioning step 101 first positions an object 600 on the rotor 400 in a first arrangement state of the object 600. The positioning may in particular comprise loading the object 600 onto the rotor 400. In this regard, an object 600 may e.g. comprise a three-dimensional object or a plurality of three-dimensional objects. These may e.g. be manufacturing products or sub-products of various sizes that are manufactured or further processed in a manufacturing process. The manufacturing products may be of different shapes, sizes, masses, and made of a wide variety of materials. A first arrangement state may comprise a position or orientation relative to the rotor for such an object. As an alternative, an arrangement state may be an ordering or sorting of individual items within a plurality of three-dimensional items of the object 600 to be transported.

As an alternative, an object 600 may comprise a bulk material that may be filled into a container. In such a case, an arrangement state may e.g. describe a filling density at which the bulk material is filled into the container or an uneven filling of the container with the bulk material in which individual regions of the container are unevenly filled.

As an alternative, an object 600 may comprise a bulk material having at least two different components. In such a case, an arrangement state may describe a degree of mixing of the two components.

As an alternative, an object 600 may comprise a fluid having a plurality of components filled into a container. In such a case, an arrangement state may e.g. describe a mixing of the plurality of components or a solution of a solid component of the fluid.

Thus, an object 600 may comprise any item or a plurality of items that are e.g. manufactured in a manufacturing or processing process, used to manufacture another product, or further processed in a processing operation, and that may come in a wide variety of shapes, forms, sizes. As an alternative, an object 600 may be transported in a picking process without being processed or manufactured.

In this context, the first arrangement state of the object 600 may be in any or random arrangement state in which the object 600 is positioned on the rotor 400. As an alternative, the first arrangement state may be defined by a characteristic embodiment of a loading device used for positioning the object 600 to be transported, which is arranged to position the object 600 in a specific arrangement state on the rotor.

After positioning the object 600 on the rotor 400, in an arranging step 103, the object 600 arranged on the rotor 400 in the first arrangement state is brought into a second arrangement state by carrying out an accelerating movement of the rotor 400. In this context, the accelerating movement may be effected by appropriately driving the stator module 300 and appropriately modifying the stator magnetic fields. An accelerating movement may comprise at least a jerky acceleration in the form of an acceleration pulse in an acceleration direction of the rotor 400. The acceleration pulse may have a defined acceleration strength and a defined acceleration duration in the form of a pulse width. In this regard, a movement pattern may comprise an accelerated translational movement of the rotor 400 in a translational acceleration direction and/or an accelerated rotational movement of the rotor 400 about a rotational axis.

According to an embodiment, a movement pattern may be an oscillatory movement pattern that provides for jerking the rotor 400 back and forth in an oscillatory movement. For example, this may be in an oscillatory translational movement in which the rotor 400 is alternately shifted in oppositely directed translational movements relative to the stator module 300. As an alternative, the oscillatory movement pattern may comprise an oscillatory rotational movement about a rotational axis, where the oscillatory movement pattern provides for rotating the rotor 400 alternately in opposite rotational directions about the rotational axis. The oscillatory movement pattern may thus generate a shaking movement of the rotor 400, in which the rotor 400 exerts a shaking function on the object 600 positioned on the rotor 400 via a jerky oscillatory shift or rotation.

The oscillatory movement pattern may have an arbitrarily selectable number of acceleration pulses to be executed in temporal succession. The acceleration pulses may have identical or different acceleration strengths. The acceleration pattern may further comprise a selectable execution duration. The acceleration pulses may be executed immediately one after the other. As an alternative, the acceleration pulses may be executed with a pause between successive acceleration pulses. Acceleration pulses may have identical acceleration directions or oppositely directed acceleration directions. For oppositely directed accelerating movements, directly successive acceleration pulses may each have oppositely directed acceleration directions. As an alternative, an arbitrarily selectable number of acceleration pulses having identical acceleration directions may be followed by a number of acceleration pulses having identical but oppositely directed acceleration directions.

Individual acceleration pulses may have identical acceleration strengths and/or acceleration durations. As an alternative, the acceleration pulses of a movement pattern may have different acceleration strengths and/or acceleration durations.

The translational acceleration direction or the rotational axis of the accelerated translational or rotational movement may be oriented in any spatial direction. For example, the rotational axis may be oriented perpendicular with regard to the surface of the rotor 400 so that a rotational movement continues to leave the rotor 400 oriented in parallel with regard to the stator surface. As an alternative, the axis of rotation may be oriented in parallel with regard to the surface of the rotor 400, allowing a tilting movement of the rotor 400 to be generated.

As an alternative, the movement pattern may comprise a plurality of superimposed accelerated translational movements in different translational acceleration directions and accelerated rotational movements about different rotational axes. This may produce a complex accelerated movement of the rotor 400 comprising a superposition of individual accelerated translational and/or rotational movements.

In this regard, the accelerating movement of any movement pattern may have an arbitrarily selectable acceleration strength that describes a value of the change in velocity of the movement of the rotor 400 caused by the acceleration. In the case of an oscillatory movement pattern, the oscillatory movement of the rotor 400 may be generated at an arbitrary frequency. In this case, the frequency of the acceleration pattern results from the time sequence of the plurality of acceleration pulses executed in temporal succession. Since the oscillatory movement of the rotor 400 is performed by appropriately actuating the stator magnetic fields of the stator module 300, and in that the rotor 400 may be moved smoothly over the stator module 300, the oscillatory movement of the rotor 400 is not limited by any resonant frequency, so that when the rotor 400 is shaken, the oscillatory movement pattern of the accelerating movement may generate a shaking function with an arbitrarily selectable frequency.

The frequency of the movement pattern is in particular continuously adjustable at least between 0-200 Hz. An acceleration strength of the acceleration pulses may also be continuously varied between 0 and 20 $m/sec^2$. An execution duration of a movement pattern, in particular an oscillatory movement pattern, may be between a few seconds up to a plurality of days.

Depending on the type of object 600 positioned on the rotor 400, an accelerating movement may be generated according to a correspondingly adjusted movement pattern. Here, an adjustment of the accelerating movement, in particular the translational acceleration direction and/or alignment of the rotational axis and/or the number of successive acceleration pulses and/or the frequency and/or the acceleration strength of the acceleration pulses and/or the acceleration duration of the acceleration pulses and/or the execution duration of the movement pattern may be adjusted to properties of the object 600, e.g. the respective mass or shape or form (solid, fluid, bulk material) of the object 600.

By carrying out the accelerating movement according to the defined movement pattern, the object 600 disposed on the rotor 400 is brought to a second arrangement state.

In this case, a second arrangement state of the object 600 describes a desired arrangement state of the object 600 that is specifically brought about by executing the accelerating movement of the rotor 400. The second arrangement state differs from the first arrangement state in at least one feature, depending on the type of object 600.

Depending on the type of object in question, various states or arrangements of the object 600 on the rotor 400 may be described hereby. For example, for an object embodied as a three-dimensional object, the arrangement state may be a positioning or an orientation of the object 600 relative to the rotor 400. In this case, the first and second arrangement states differ by the positioning or orientation of the object 600 relative to the rotor 400.

Thus, due to the inertia of the object 600 arranged on the rotor 400 in an unfastened manner, the position of the object 600 on the rotor 400 or its orientation relative to the rotor 400 may be changed by executing the accelerating movement, in that due to the jerkily accelerated movement of the rotor 400, the object 600 to be transported is driven to move relative to the rotor 400. For example, due to the jerkily accelerated movement of the rotor 400, the object 600 may perform a translational movement, tilting movement, or rotational movement, or a combination thereof, relative to the rotor 400. In an accelerating movement according to an oscillatory movement pattern, the object 600 to be transported may perform a corresponding translational movement, tilting movement, or rotational movement, or a combination of these movements, relative to the rotor 400 for each acceleration pulse of the oscillatory shaking movement of the rotor 400.

As an alternative, the object may be formed as a plurality of three-dimensional objects or items. In this case, an arrangement state may be an order of the individual objects with respect to one another, and the first and second arrangement states may differ in the degree of order of the objects of the object 600. By carrying out the accelerating movement, for example according to an oscillatory movement pattern, and by carrying out a corresponding shaking movement, the order of the plurality of objects relative to one another may be changed by each of the objects carrying out the translational movements, tilting movements, rolling movements, or rotational movements described above, or a combination of these movements relative to the rotor 400.

For an object embodied as a bulk material within a corresponding container, an arrangement state may e.g. be a degree of compaction in which the bulk material is arranged in the respective container. In this context, the first arrangement state and the second arrangement state may differ in the degree of compaction of the bulk material. By carrying out the accelerating movement, the bulk material arranged in the container may thus be compacted or loosened up. As an alternative, the arrangement state may be a degree of mixing or de-mixing of individual components of the bulk material, and by executing a corresponding accelerating movement, for example in accordance with an oscillatory movement pattern, a mixing of the various components or de-mixing of the components may thus be achieved.

As an alternative, the object 600 may be a fluid e.g. consisting of at least two components. In this regard, an arrangement state may be a degree of mixing/de-mixing of the at least two components or a degree of dissolution/deposition of a solid component of the fluid. Accordingly, the first and second arrangement states may differ in the degree of mixing/de-mixing or the degree of dissolution/deposition of the components.

According to an embodiment, the movement pattern further comprises a braking movement. In this context, the braking movement may have an acceleration direction opposite to the acceleration direction of the acceleration pulse of the movement pattern. The braking movement may in this context have a lower acceleration strength and/or a greater acceleration duration and/or a smaller temporal acceleration change than the acceleration pulse. The braking movement thus leads to a slow deceleration of the movement of the rotor 400 caused by the acceleration pulse or pulses of the movement pattern.

If the acceleration pulse or pulses lead to a jerky movement of the rotor 400 involving a large change in velocity, the braking movement instead leads to a slow decrease in velocity, so that the accelerating movement of the rotor 400 with a gradually reduced velocity ultimately comes to a standstill. By gradually decelerating the accelerating movement, the object 600 may be positioned on the rotor 400 in the desired second arrangement state. The gradual braking of the accelerating movement, on the other hand, does not cause any further change in the arrangement state of the object 600 on the rotor 400, but maintains the second arrangement state obtained by previously executed accelerating movement of the rotor 400. In this case, the braking movement may be set up with respect to the acceleration direction and/or acceleration strength and/or acceleration duration in such a way that the rotor is moved back by the braking movement to an initial position in which the rotor was positioned before the accelerating movement began.

FIG. 5 shows another flowchart of the method 100 for controlling a planar drive system 200 according to another embodiment.

The embodiment of method 100 in FIG. 5 is based on the embodiment of method 100 in FIG. 4 and comprises all the method steps described there. Insofar as these remain unchanged in the embodiment in FIG. 5, a renewed detailed description is dispensed with.

Deviating from the embodiment in FIG. 4, the method 100 in the embodiment in FIG. 5 comprises a transporting step 105.

After positioning the object 600 on the rotor 400, in a transporting step 105 the rotor is moved between a first position and a second position relative to the stator module 300. Here, the first position may e.g. be a loading station in which the object 600 to be transported is positioned on the rotor 400 in the first arrangement state. A second position may e.g. be an unloading position in which the object 600 to be transported is unloaded from the rotor 400. As an alternative, the second position may be a processing position in which the object 600 positioned on the rotor 400 is processed by a corresponding processing device at the processing position. Potentially unloading or potentially processing the object at the unloading position or the processing position may require a predetermined orientation of the object 600. Thus, for unloading or processing, the object 600 may be brought into the predetermined orientation, i.e., the targeted second arrangement state, by carrying out the accelerating movement in the arranging step 103.

Arranging the object 600 in the desired second arrangement state by carrying out the accelerating movement in accordance with the appropriate movement pattern in the arranging step 103 may be performed simultaneously with moving the rotor 400 from the first position to the second position. As an alternative, carrying out the accelerating movement and the associated arranging of the object 600 in the second arrangement state may be carried out in time before or after the travel of the rotor 400 between the first and second positions.

FIG. 6 shows a further flowchart of the method 100 for controlling a planar drive system 200 according to a further embodiment.

The embodiment of method 100 in FIG. 6 is based on the embodiment of method 100 in FIG. 5 and comprises all the method steps described therein. Insofar as these remain unchanged in the embodiment in FIG. 6, a renewed detailed description is dispensed with.

In the embodiment shown in FIG. 6, the method 100 comprises a determining step 109 in which a type of object 600, a first arrangement state and a second arrangement state to be achieved are determined or detected. In this regard, the type of object may comprise a size, a shape, a mass, a form, a bulk property, a liquid property, a degree of mixing, or a degree of dissolution. Depending on the type of object, the first arrangement state and/or the second arrangement state may be a positioning and/or orientation of the object 600 on the rotor 400.

In particular, in the case in which the object is embodied as a three-dimensional object or a plurality of three-dimensional objects, the arrangement state may be defined by the position or orientation of the object with respect to the rotor 400.

In the case of a plurality of objects, the arrangement state may further comprise an ordering of the individual objects with respect to one another. In the case in which the object 600 is embodied as a bulk material or a fluid, the arrangement state may be a compaction of the bulk material within a container.

In the case of a bulk material or a fluid consisting of a plurality of components, the arrangement state may be a mixing or a de-mixing or a solution of a solid component within a fluid. Thus, by changing the arrangement states, the degree of compaction of a bulk material arranged in a container may be changed. As an alternative, a mixing of multiple components within a bulk material or fluid may be changed. Moreover, by applying the accelerating movement, a solid within a fluid may be dissolved.

After determining the type of object 600 and the first and second arrangement states, respectively, a movement pattern selecting step 111 may select a corresponding movement pattern that is arranged to move an object of the respective determined type from a corresponding first arrangement state to a second arrangement state. The respective selected movement patterns may be stored in a list/database of already predetermined movement patterns, so that an accelerating movement may be performed according to an already predetermined movement pattern. The movement patterns stored in the list/database are set up to bring a corresponding object of a corresponding type into the respective desired arrangement state.

The determining step 109 as well as the selecting step 111 may be carried out manually by a user of the planar drive system 200 by informing the controller of the planar drive system 200 of the respective type of object 600 or of the corresponding arrangement states, respectively, and a corresponding movement pattern is automatically selected by the controller 201 in the selecting step 111. As an alternative, the user may directly select a corresponding movement pattern in the selecting step 111.

As an alternative, both the determining step 109 and the selecting step 111 may be carried out automatically by the controller 201 of the planar drive system. For this purpose, in the determining step 109, an object recognition of the object 600 arranged on the rotor 400 and/or a classification of the recognized object 600 according to a corresponding object classification may be performed, e.g. with the aid of a corresponding camera system for creating an image and/or video recording of the object 600 arranged on the rotor 400 and with the aid of correspondingly trained neural networks, which are set up to carry out an object recognition of the object 600 on the basis of the image and/or video recording and to assign the recognized object 600 to a corresponding object class.

On the basis of the object recognition and/or the object classification, suitable movement patterns may subsequently be automatically selected that are considered to be suitable for objects of the corresponding class. For this purpose, a plurality of predefined movement patterns may be defined for objects of a plurality of different object classes and, if necessary, stored in a corresponding database. With the aid of a correspondingly suitable algorithm, a suitable movement pattern may be selected from the database on the basis of the object classification of the object 600 and selected by the controller.

For mixing the two components, the accelerating movement comprises a rotational movement about a rotational axis oriented perpendicular with regard to the surface of the rotor 400, so that a stirring function of the fluid filled in a container is achieved on the rotor 400. The stirring function is obtained by alternately rotating the rotor 400 and the container disposed on the rotor back and forth. The number of acceleration pulses of the movement pattern may be made variable, e.g. by tracking the mixing state and executing the movement pattern until the desired mixing state is reached. The individual acceleration pulses may have the same acceleration strength.

A second object is e.g. a bulk material and by carrying out the method 100, a filling density of the bulk material in a container provided for this purpose is to be increased. For this purpose, an oscillatory movement pattern with a translational movement may again be used, which causes a shaking movement of the rotor 400, thereby compacting the bulk material in the container. For compacting such a bulk material, e.g. experience of previous compaction functions of similar bulk materials may have shown that a number of 100 successive acceleration pulses is sufficient to achieve the desired compaction condition. The movement pattern may thus be limited to this number. The individual acceleration pulses may e.g. have different acceleration strengths, which decrease in descending order as the movement pattern continues.

A third object may e.g. be a single component that is to be brought into a desired orientation on the rotor 400 by executing the method 100. The movement pattern to be executed for this purpose may e.g. comprise only a single acceleration pulse and describe a rotational movement about an axis of rotation arranged in parallel to a surface of the rotor, thereby achieving a tilting movement of the rotor 400 that moves the component into the desired orientation. The acceleration strength of the acceleration pulse may be selected variably in this case and depend on the nature of the component (shape, mass, etc.).

TABLE 1

Different object types and predefined movement patterns

| Type of object | First arrangement state | Second arrangement state | Type of movement pattern | Accelerating movement | Number of pulses | Acceleration strength |
|---|---|---|---|---|---|---|
| Fluid | First mixed state | Second mixed state | Oscillatory | Rotation | Variable | Constant |
| Bulk material | First filling density | Second filling density | Oscillatory | Translation | 100 | Descending |
| Single component | First alignment | Second alignment | Single pulse | Rotation/tilting movement | Single pulse | Variable |
| Group of components | First sorting state | Second sorting state | Oscillatory | Translation + Rotation | 50 + 50 | Alternating |

In Table 1, examples of different objects of different object types and, for this purpose, possibly stored predefined movement patterns are shown, which are suitable for changing the arrangement state of the respective object.

A first object is e.g. provided as a fluid having at least two components for which mixing is to be achieved by application of the method 100. In a first arrangement state, the fluid is in a first mixing state of the two components, in which both components are completely segregated, for example. In this case, the second arrangement state represents the desired mixing of the two components, in which both components are completely mixed, for example. The mixing is in this context to be achieved by executing an accelerating movement according to an oscillatory movement pattern.

A fourth object 600 may e.g. comprise a plurality of components, each of which is to be brought into a desired state of order by carrying out the method 100. For this purpose, e.g. an oscillatory movement pattern comprising oscillatory translational and rotational movements may be carried out. For example, 50 acceleration pulses of translational movement and 50 acceleration pulses of rotational movement may be executed one after the other. The acceleration pulses may e.g. have different acceleration strengths that are executed alternately.

The objects and associated movement patterns shown in Table 1 are merely exemplary and do not represent actual applications of the method 100. The examples shown are intended to illustrate the relationship between the type of object, the arrangement state to be achieved, and the movement patterns that may be used for this purpose. In addition to the features shown, the movement patterns may comprise further features, such as execution duration of the movement pattern or acceleration duration of the acceleration pulses.

The respective selected movement patterns may be generated individually. As an alternative, the movement patterns with correspondingly predetermined properties may be stored in a list/database of possible movement patterns, so that suitable movement patterns may be selected and automatically executed for an object of a certain type and for corresponding arrangement states, which have e.g. have proven suitable in previous embodiments for achieving the desired arrangement state.

In the embodiment shown in FIG. 6, the arranging step 105 further comprises a first detecting step 113. In the first detecting step 113, the object 600 arranged on the rotor 400 is monitored while executing the accelerating movement of the rotor 400, and an arrangement state of the object 600 while executing the accelerating movement is detected.

For this purpose, the detecting step 113 comprises a force determining step 119 and a monitoring step 121.

In the force determining step 119, a force required to maintain the rotor 400 in a floating state above the stator surface 301 of the stator module 300 may be determined for monitoring the object 600. On the basis of the determined magnetic force required to maintain the floating state, a positioning or an orientation of the object 600 on the rotor 400 may be determined. Determining the required magnetic force may be done by the stator module 300 or by the controller 201 of the planar drive system 200, respectively. As an alternative, a magnetic force required to carry out the accelerating movement of the rotor 400 may be determined. On the basis of the determined magnetic force required to carry out the accelerating movement of the rotor 400 including the object 600 disposed on the rotor 400, a positioning or orientation of the object 600 on the rotor 400 may be determined. As an alternative, a magnetic force required to move the rotor 400 between the first position and the second position may be determined. On the basis of the determined magnetic force, a positioning or orientation of the object 600 on the rotor 400 may again be determined.

In the monitoring step 121, in order to monitor the object 600 while carrying out the accelerating movement, an arrangement state of the object 600 may be determined with the aid of a monitoring device, which may e.g. be an optical monitoring device or an acoustic monitoring device or an electromagnetic monitoring device. The optical monitoring device may e.g. be a camera system arranged to view the object 600 on the rotor 400 and thus determine an arrangement state when carrying out the accelerating movement.

Furthermore, the arranging step 105 comprises an adjusting step 115. In the adjusting step 115, based on the arrangement state of the object 600 determined in the first detecting step 113, the movement pattern used to execute the accelerating movement and, consequently, the execution of the accelerating movement may be adjusted. If it is determined in the first detecting step 113 that the object 600 is not arranged in the second arrangement state, and consequently the executed accelerating movement is not sufficient to bring the object 600 in the desired second arrangement state, an adjustment of the movement pattern used may be carried out in the adjustment step 115. For example, the acceleration strength or acceleration duration of the acceleration pulses may be adjusted for adjustment. As an alternative, if an oscillatory movement pattern is used, the frequency used may be adjusted. Furthermore, the translational acceleration direction or a rotational axis may be changed in case of an accelerated rotational movement. As an alternative, the movement pattern used may be superimposed with another movement pattern by combining a plurality of different accelerated translational movements and/or accelerated rotational movements. As an alternative, instead of adapting the used movement pattern, another movement pattern may be selected that is more suitable for the arrangement of the respective object and, if necessary, is stored with predetermined properties in a corresponding database.

The adjustment of the movement pattern in the adjusting step 115 may be carried out manually by a user who tracks the progression of the change in the arrangement state of the object 600 due to the accelerating movement performed and carries out the adjustment to the movement pattern accordingly.

As an alternative, the adjustment of the movement pattern may be carried out automatically. For this purpose, an automatic detection of the respective current arrangement state of the object 600 may be performed in the first detecting step 113. For this purpose, for example, an appropriately trained neural network may be used that is appropriately set up to determine an arrangement state of the object 600 based on the magnetic force data determined in the force detecting step 119. As an alternative, another trained neural network may be used that is set up to recognize and classify the current arrangement state on the basis of image and/or video recordings of the camera system taken in the monitoring step 121 with the aid of object recognition.

On the basis of the determined arrangement state, a suitable adjustment of the arrangement state may subsequently be determined, e.g. by a further trained neural network. For this purpose, e.g. the neural network or another suitable algorithm may select a suitable adjustment strategy from a plurality of predefined adjustment strategies stored in a corresponding database and perform a corresponding adjustment of the movement pattern. In this context, the adjustment strategies may contain information, taking into account the type of object 600 and the current arrangement state and the second arrangement state to be achieved, based on the movement pattern used, which components of the movement pattern, e.g. the acceleration direction, acceleration strength, number of acceleration pulses, etc., are to be adjusted in order to achieve the desired second arrangement state.

As an alternative, the trained neural network or a suitable algorithm may select a suitable movement pattern to replace the original movement pattern from a plurality of predefined movement patterns stored in a corresponding database.

Furthermore, the arranging step 105 comprises a second detecting step 117 in which the object 600 is detected in the second arrangement state. After carrying out of the accelerating movement and successful transfer of the object 600 into the desired second arrangement state, the accelerating movement may be terminated in the second detecting step 117. In order to detect the object 600 in the second arrangement state in the second detecting step 117, a detection according to the force determining step 119 and the monitoring step 121, respectively, may again be performed by determining the required magnetic force for executing the above-mentioned movements of the rotor 400 or with the aid of the optical and acoustic recordings, respectively, of the respectively configured monitoring device. As an alternative, the force determining step 119 and the monitoring step 121 may be carried out in parallel.

The detection of the object 600 in the second arrangement state in the second detecting step 117 may be carried out analogously to the first detecting step 113 by a correspondingly trained neural network which is set up to carry out an object recognition and a corresponding classification either on the basis of the magnetic force data or on the basis of the image and/or video recordings of the camera system, on the basis of which a recognition of the second arrangement state is made possible.

As an alternative to monitoring the progress of the arrangement of the object 600 in the second arrangement state in the first monitoring step 113 and the subsequent adjustment of the respective movement pattern, e.g. when a predefined movement pattern is executed, e.g. for a predefined execution duration, and which is suitable for bringing the object into the desired second arrangement state by complete execution of the movement pattern, the object 600 in the second arrangement state may be detected directly in the second monitoring step 117.

The monitoring device and, in particular, the camera system may each be fastened to the rotor and connected to the controller 201 via a corresponding communication device, e.g. with the aid of a radio transmission device. As an alternative, the monitoring device may be fastened to an external suspension device of the planar drive system 200. In this case, the monitoring device may be positioned in such a way that the entire stator module 300 or the entire running surface of the planar drive system 200 formed by a plurality of stator modules 300 may be inspected by the monitoring device. As an alternative, a plurality of monitoring devices may be placed at different positions, each monitoring device being able to view the entire running surface or a portion of the running surface. As an alternative, the monitoring device may be a movable monitoring device that may follow a movement of a rotor 400. For example, the monitoring device may be configured as a controllable drone.

Figure 7:
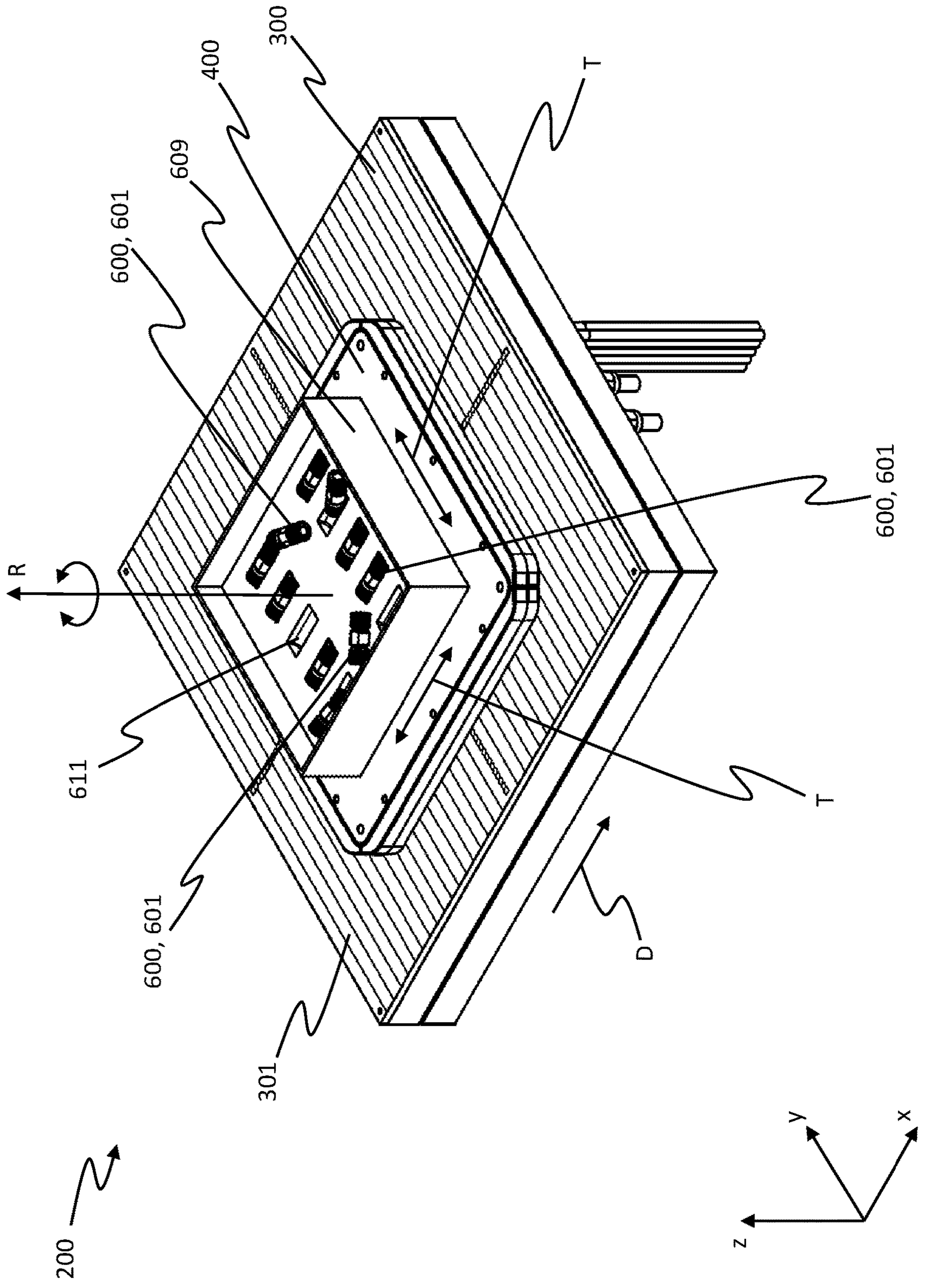
FIG. 7 is a schematic depiction of a rotor on a stator module according to an embodiment.

FIG. 7 shows a schematic depiction of a rotor 400 on a stator module 300 according to an embodiment.

FIG. 7 shows an embodiment of the planar drive system 200 that is arranged to carry out the method 100 according to the application. In the embodiment in FIG. 7, comparable to FIGS. 1 to 3, only one stator module 300 and one rotor 400 of the planar drive system 200 are shown. As an alternative, the planar drive system 200 may have any number of stator modules 300 arranged side by side. This may generate any surface on which any number of rotors 400 may be moved.

In the embodiment shown in FIG. 7, an object 600 is disposed on the rotor 400. In the embodiment shown, the object 600 comprises a plurality of components 601. In FIG. 7, the components are shown as arbitrary components merely by way of example. As an alternative, in addition to a component 601, an object may also be a food or feed product generated, produced, or processed in a food or feed processing operation, for example. As an alternative, the component 601 may be any object.

Furthermore, in the embodiment shown in FIG. 7, the rotor 400 comprises a sorting device 609 having a plurality of receiving openings 611 set up to receive the components 601.

The rotor 400 is further arranged to carry out a sorting function via the execution of a corresponding accelerating movement, with the aid of which the components 601 may be arranged in the receiving openings 611 of the sorting device 609 provided for this purpose. For this purpose, the rotor 400 may be accelerated along various translational acceleration directions T. As an alternative, the rotor 400 may be accelerated about a rotational axis R in an accelerated rotational movement.

FIG. 7 shows an axis of rotation R that is perpendicular to a stator surface 301 of the stator module 300. Thus, the rotor 400 may be rotated in a plane spanned by the spatial directions x and y. In addition, FIG. 7 shows two translational acceleration directions T arranged at right angles, each of which is arranged in the plane spanned by the spatial directions x and y. Over this, the rotor may thus be accelerated both in the x-direction and in the y-direction in a corresponding translational movement. The rotor may be moved according to an oscillatory movement pattern both along the translational acceleration directions and about the rotational axis R in an oscillatory translation or rotation, respectively. This may generate a shaking movement of the rotor 400, via which the components 601 may be moved back and forth within the sorting device 609, thus achieving a placement of the components 601 into the receiving openings 611 provided for this purpose.

The movement pattern used for this purpose may consist of individual accelerated translational movements or an oscillatory accelerated translational movement. As an alternative, the executed movement pattern may comprise an accelerated rotational movement around the rotational axis R or an oscillatory accelerated rotational movement. As an alternative, the movement pattern may comprise any superposition of accelerated translational movement and accelerated rotational movement. For example, a translational movement in any direction within the plane spanned by the spatial directions x and y may be achieved by superimposing the two translational movements.

The translational acceleration directions T and the rotational axis R shown in FIG. 7 are only examples of possible translational and rotational movements. As an alternative, the translational acceleration directions T or rotational axes R may be oriented in any spatial directions.

By executing a corresponding accelerating movement, according to the method steps described above, on the basis of a correspondingly selected movement pattern, the rotor 400 may be set into a corresponding translational or rotational movement. Through this, the components 601 arranged in the sorting device 609 may be accelerated in any spatial directions relative to the rotor 400 due to their inertia and the jerky acceleration of the rotor 400, so that the components 601 change both their positioning and their orientation relative to the rotor 400. In the embodiment shown, a first arrangement state of the components 601 may e.g. describe the case in which the components 601 are arranged in an arbitrarily disordered manner on the sorting device 609. A desired second arrangement state may e.g. describe the case in which all components 601 are arranged in the respective receiving openings 611 provided therefor.

By executing the accelerating movement according to the method 100 of the application, a sorting process may thus be carried out by arranging the components 601 arranged as desired in the sorting device 609 in the respective receiving openings 611 provided for this purpose. For this purpose, the rotor 400 may be set into a corresponding accelerated translational or rotational movement. The receiving openings may be embodied in such a way that components 601 that have already been sorted are not shaken out of the receiving opening 611 again by further accelerating movements.

According to the method steps described above, the respective arrangement state of the components 601 may be monitored during the execution of the accelerating movement. Depending on the progress of the sorting of the individual components 601 into the receiving openings 611 provided for this purpose, the accelerating movement performed may be adjusted accordingly so that sorting of the individual components 601 into the receiving openings 611 provided for this purpose may take place. For this purpose, e.g. the acceleration strength as well as the acceleration direction as well as, in the case of an oscillatory accelerated movement, the frequency of the oscillatory movement may be adjusted to the properties of the components 601 as well as to the observed arrangement state. Depending on the size or mass of the individual components 601, the acceleration strength of the accelerating movement may be adjusted in such a way that an optimal acceleration of the components within the arrangement device 609 may be achieved. Furthermore, a targeted acceleration of the rotor may be carried out in targeted acceleration directions so that e.g. individual components 601 are moved in a desired direction within the arrangement device 609 in order to thus move them into corresponding receiving openings 611.

By accelerating the rotor 400 in accordance with the accelerating movement of the respective acceleration pattern and the associated acceleration of the sorting device 609, which may be fixedly attached to the rotor 400, a relative movement of each of the non-fixed components 601 relative to the sorting device 609 is caused due to the inertial mass of the individual components 601. Through this, a targeted relative movement of the components 601 or individual components 601 relative to the sorting device 609 may be achieved by targeted control of the accelerating movement with corresponding acceleration strength and targeted acceleration direction. By selectively controlling the rotor 400 with a corresponding acceleration strength and a suitable acceleration direction, individual components 601 may thus be selectively moved relative to the sorting device 609, so that by this process individual components 601 may be moved into the receiving openings 611 provided for this purpose.

By monitoring the progress of the sorting process effected by executing the accelerating movement, e.g. with the aid of the monitoring device in FIG. 7, the executed accelerating movement or the respective movement pattern may thus be adjusted in such a way that sorting of the individual components 601 into the receiving openings 611 provided for this purpose may be achieved. When the second arrangement state is reached, which may e.g. be the case when a certain number of components 601 have been sorted into the receiving openings 611 provided for this purpose, the accelerating movement may be terminated in accordance with the movement pattern provided for this purpose.

Furthermore, the rotor 400 may be moved along a movement direction D between individual points on the stator module 300 or the running surface of the planar drive system 200 formed by the plurality of stator modules. The accelerating movement according to the defined movement pattern for carrying out the sorting function may be performed simultaneously with the travel of the rotor 400 along the movement direction D. As an alternative, the travel of the rotor 400 along the direction of movement D and the execution of the accelerating movement for executing the sorting function may be executed separately in time.

Figure 8:
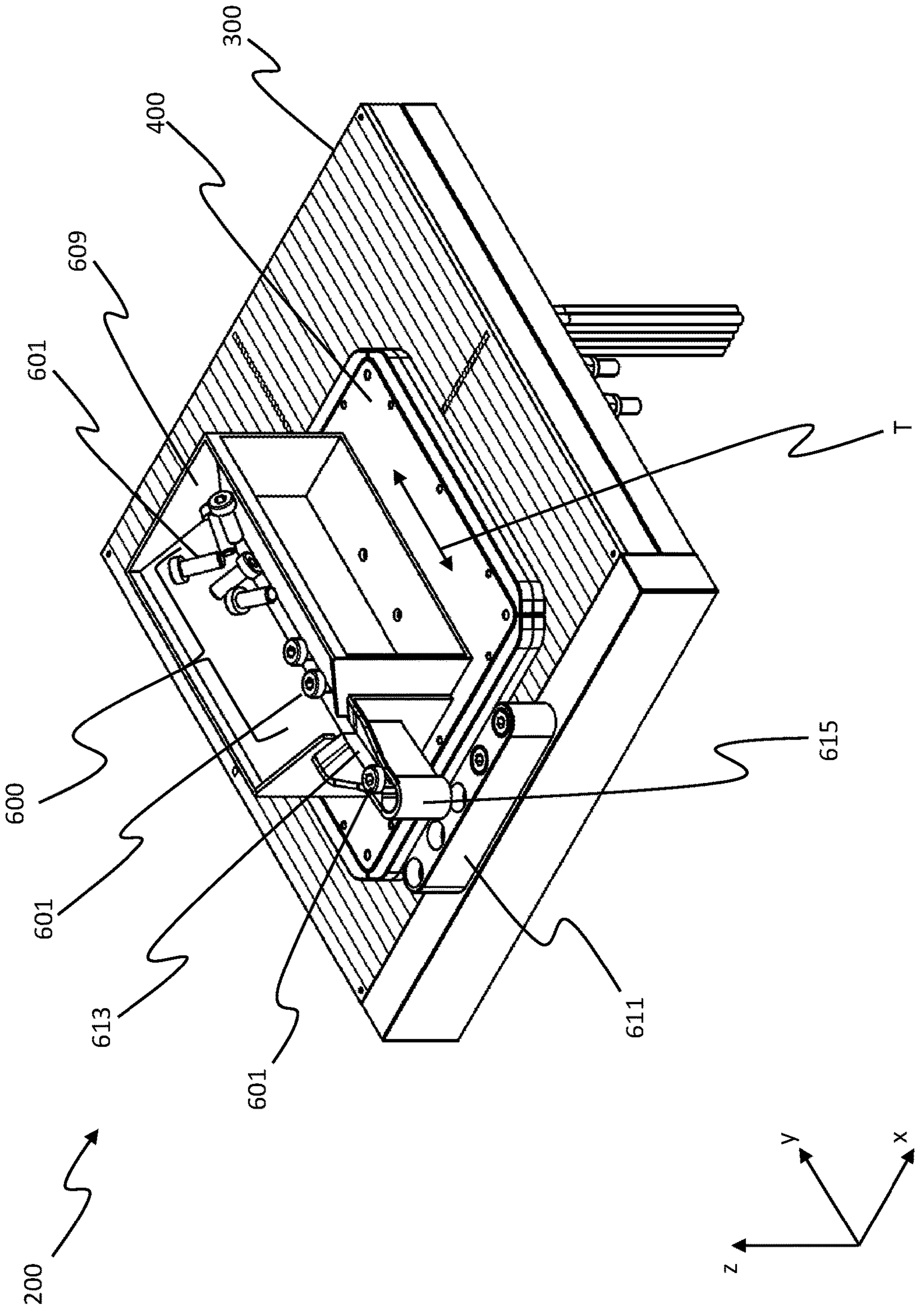
FIG. 8 is a schematic depiction of a rotor on a stator module according to an embodiment.

FIG. 8 shows another schematic depiction of a rotor 400 on a stator module 300 according to another embodiment.

FIG. 8 shows a further embodiment of the planar drive system 200. Analogously to the embodiment in FIG. 7, the planar drive system 200 is set up to carry out a sorting function by executing a corresponding accelerating movement in accordance with the method 100 described above. For this purpose, a sorting device 609 is again embodied on the rotor 400, which is set up to sort the components 601 into corresponding receiving openings 611. In the embodiment in FIG. 8, the components 601 are formed as rivets. However, analogous to the embodiment in FIG. 7, this is merely exemplary. The sorting device 609 further comprises a sorting chute 613, which is set up to receive the components 601 embodied as rivets and to convey them towards an output element 615 under the effect of the accelerating movement. Via the output element 615, the individual components 601 may be inserted into the receiving openings 611 provided for this purpose. In the embodiment in FIG. 8, the receiving openings 611 are arranged on the stator module 300 so that sorting the components 601 into the receiving openings 611 simultaneously causes unloading of the components 601 from the carriage 400. The embodiment of the receiving openings on the stator module 300 is merely exemplary in nature and serves exclusively to illustrate the described sorting or unloading process.

In the embodiment shown, a first arrangement state of the components 601 may e.g. describe the case in which the components 601 are arranged in random orientation and positioning in the sorting device. A second arrangement state of the components 601 may e.g. describe the case in which all components 601 are arranged in the receiving chute 613.

Via a corresponding accelerating movement or, as the case may be, oscillatory accelerating movement according to the steps described above, a relative movement of the individual components 601 relative to the sorting device, which is connected to the rotor 400 in a stationary manner, may be effected as described above. Hereby, in accordance with the above-described triggering of the rotor 400 in accordance with corresponding movement patterns, it may be achieved that the individual components 601 are arranged in the sorting chute 613 provided for this purpose. As described for FIG. 7, suitable accelerated translational movements or accelerated rotational movements may be carried out in corresponding translational acceleration directions or about corresponding rotational axes for this purpose.

By monitoring the sorting process via a monitoring device, the accelerating movements performed may be adjusted so that sorting of the individual components 601 into the sorting chute 613 provided for this purpose may be achieved. The sorting process may further be executed during the travel of the rotor.

After sorting the individual components into the sorting chute 613, each component 601 arranged in the sorting chute 613 may be accelerated in the direction of the output element 615 with the aid of an accelerating movement along the illustrated translational acceleration direction T, so that an output of the respective component 601 to a corresponding receiving opening 611 may be effected via the output element 615. The output of the individual components 601 via the output element 615 and the associated unloading of the individual components 601 may in turn be implemented by driving the rotor 400 in accordance with a corresponding accelerating movement. An additional unloading device for unloading the transported components may thus be avoided.

Figure 9:
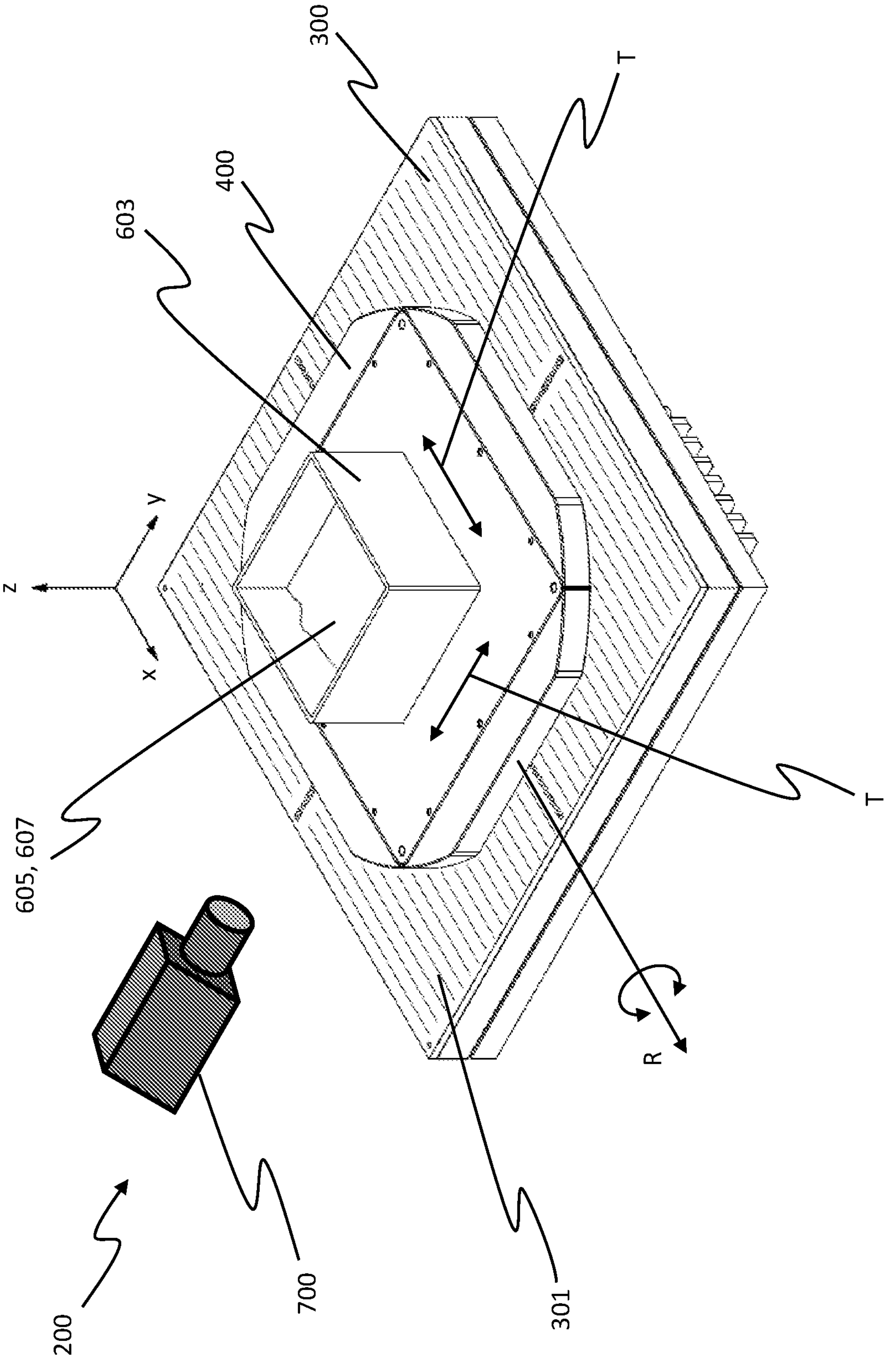
FIG. 9 is a schematic depiction of a rotor on a stator module according to an embodiment.

FIG. 9 shows another schematic depiction of a rotor 400 on a stator module 300 according to another embodiment.

FIG. 9 shows a further embodiment of the planar drive system 200, which is set up to carry out a compaction function or a mixing or de-mixing function by carrying out the method 100. In the embodiment shown in FIG. 9, the object 600 is embodied as a bulk material 605 filled in a container 603. The bulk material may e.g. be a granular material, a powdered material, a granular material, or a lumpy mixture. For example, the bulk material may be a building material or a component of a manufacturing process. As an alternative, the bulk material may be an intermediate or final product of a food manufacturing process.

With the aid of a shaking movement by carrying out an accelerating movement according to an oscillatory movement pattern as described above, a compaction function of the bulk material 605 disposed in the container 603 may be effected. In the compaction function, a degree of compaction of the bulk material within the container may be increased by allowing the bulk material 605 to be arranged in a compacted arrangement within the container 603 due to the vibrating movement of the rotor 400 and the associated relative movement of the bulk material 605 relative to the container 603 attached to the rotor 400.

In this context, a first arrangement condition may be filling the container 603 with the bulk material 605 at a random filling density, such as achieved by filling the bulk material 605 into the container 603. A desired second arrangement state may in this context be a filling of the container 603 with the bulk material 605 in a desired higher filling density, which may be achieved by a corresponding vibrating movement of the rotor 400 and a related compacting of the bulk material 605 within the container 603. This may be of particular interest in packaging operations, in that the increase in filling density may allow an increased amount of bulk material to be filled into a provided package. As an alternative, a second arrangement condition of the bulk material 605 may comprise filling the container 603 with the bulk material 605 at a lower filling density. Thus, an appropriate shaking movement of the rotor 400 may be used to loosen the bulk material 605 within the container 603.

As an alternative, a mixing or de-mixing function may be achieved by the embodiment shown in FIG. 9. In particular, in the case of bulk material with a plurality of different components, a mixing of the individual components of the bulk material 605 may be achieved by a corresponding shaking movement of the rotor and the associated shaking of the bulk material.

As an alternative, a de-mixing function may be achieved, particularly in the case of components of different sizes of the bulk material 605, by moving larger components of the bulk material to the surface of the bulk material filled into the container 603 as a result of the shaking movement of the rotor 400, from which they may be skimmed off in a subsequent process.

A first arrangement state may in this context be the filling of the container 603 with the bulk material 605 with a possibly random and/or undetermined degree of mixing or de-mixing of the individual components of the bulk material. A desired second arrangement state may be the filling of the container 603 with the bulk material 605 with a desired degree of mixing or de-mixing, in which the individual components are either, for example, completely mixed or completely segregated.

As an alternative, mixing/de-mixing may be achieved in combination with compacting/loosening of the bulk material 605 within the container 603.

As an alternative, the object 600 may be embodied as a fluid 607 filled into the container. The fluid 607 may be any fluid, optionally with multiple components. By carrying out an appropriate shaking movement of the rotor 400 according to the method steps described above by carrying out an appropriate accelerating movement according to the movement patterns described above, mixing of the individual components of the fluid 607 may be achieved. As an alternative, dissolution of soluble solid components of the fluid 607 may be achieved by carrying out the appropriate shaking movement or stirring movement of the rotor 400.

To carry out the shaking movement of the rotor 400, the rotor may perform an accelerating movement of any movement pattern. For this purpose, the rotor may e.g. carry out an oscillatory accelerated translational movement along an arbitrarily selectable translational acceleration direction T. FIG. 9 shows two examples of such a translational acceleration direction T. However, the translational acceleration directions T shown are merely exemplary and a translational accelerating movement may be performed along arbitrarily selectable translational acceleration directions oriented in any spatial direction.

As an alternative, a superposition of different accelerated translational movements may be carried out along different translational acceleration directions T. Furthermore, the rotor 400 may be oscillatorily accelerated at different frequencies. In addition to the oscillatory accelerated translational movement, the rotor may additionally or alternatively perform an oscillatory accelerated rotational movement about any selectable suitable rotational axis R. In the embodiment shown in FIG. 9, the rotational axis R is arranged in parallel to the stator surface 301 of the stator module. A tilting movement of the rotor 400 relative to the stator surface 301 of the stator module 300 may thus be achieved by a corresponding oscillatory accelerated rotational movement of the rotor 400.

For monitoring the compaction function or mixing or de-mixing function by carrying out the accelerating movement according to a defined movement pattern according to the method steps described above, the planar drive system 200 in the embodiment shown further comprises a monitoring device 700, which is arranged to track the progress of the compaction or mixing or de-mixing of the bulk material 605. The monitoring device 700 may e.g. be an optical monitoring device in the form of a camera. As an alternative, the monitoring device 700 may be any solution known in the prior art for monitoring a process.

The monitoring device 700 may be arranged to monitor the movement of the rotor 400 between different positions on the stator module 300 or on the running surface generated by the plurality of stator modules. As an alternative, the monitoring device 700 may be located such that monitoring of the rotor 400 is primarily allowed for in a designated area of the running surface. As an alternative, a monitoring device 700 may be located on each rotor individually so that direct monitoring of the arrangement state of the object placed on the rotor 400 is allowed for at any point in time.

As an alternative, a monitoring device 700 may monitor a plurality of rotors 400 simultaneously. Also, in order to check the achieved arrangement state e.g. after carrying out an accelerating movement rotors 400 may drive the monitoring area of the monitoring device 700 according to a predefined movement pattern with a predefined number of acceleration pulses to be executed or with a predefined execution duration or between the execution of different movement patterns.

Figure 10:
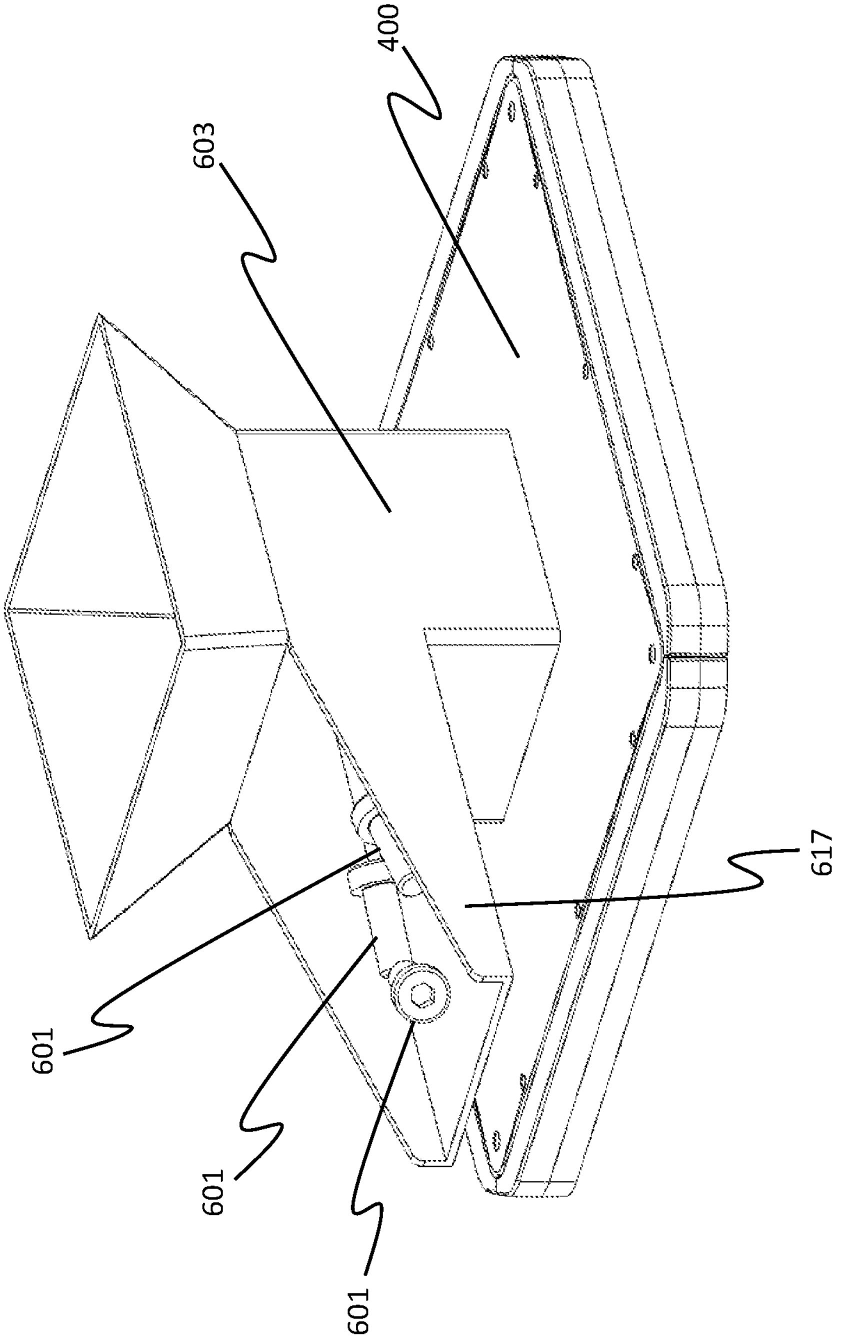
FIG. 10 is a schematic depiction of a rotor on a stator module according to an embodiment.

FIG. 10 shows a further schematic depiction of a rotor 400 according to a further embodiment.

FIG. 10 shows a further embodiment of a rotor 400 of the planar drive system 200. The rotor 400 comprises a container 603 with a portioning device 617. With the aid of the portioning device 617 and execution of a corresponding accelerating movement according to the method steps described above, a portionable object 600 may be portioned. In the embodiment in FIG. 10, the object 600 comprises a plurality of individual components 601, which in the embodiment in FIG. 10 are configured as screw elements. With the aid of a corresponding accelerating movement, any number of components 601 may be conveyed from the container 603 via the portioning device 617 and, as the case may be, unloaded by the rotor 400 in a desired number.

The unloading of the individual components 601 from the rotor 400 may thus also be effected by correspondingly controlling the rotor 400, without having to provide an additional unloading device in the planar drive system 200 for this purpose. Thus, by appropriately controlling the rotor 400 in accordance with the above-described method steps to carry out a suitable accelerating movement, the object 600 filled into the container 603 may be portioned as desired so that a desired number of components 601 may be unloaded by appropriately controlling the rotor.

The embodiments shown in FIGS. 7 to 10 are merely exemplary in nature and describe only a part of various functions that may be achieved by the planar drive system 200 carrying out the method 100. Neither the shown embodiments of the various types of an object 600 to be transported, nor the shown devices for sorting or portioning formed on the carriage 400 are intended to limit the invention.

Figure 11:
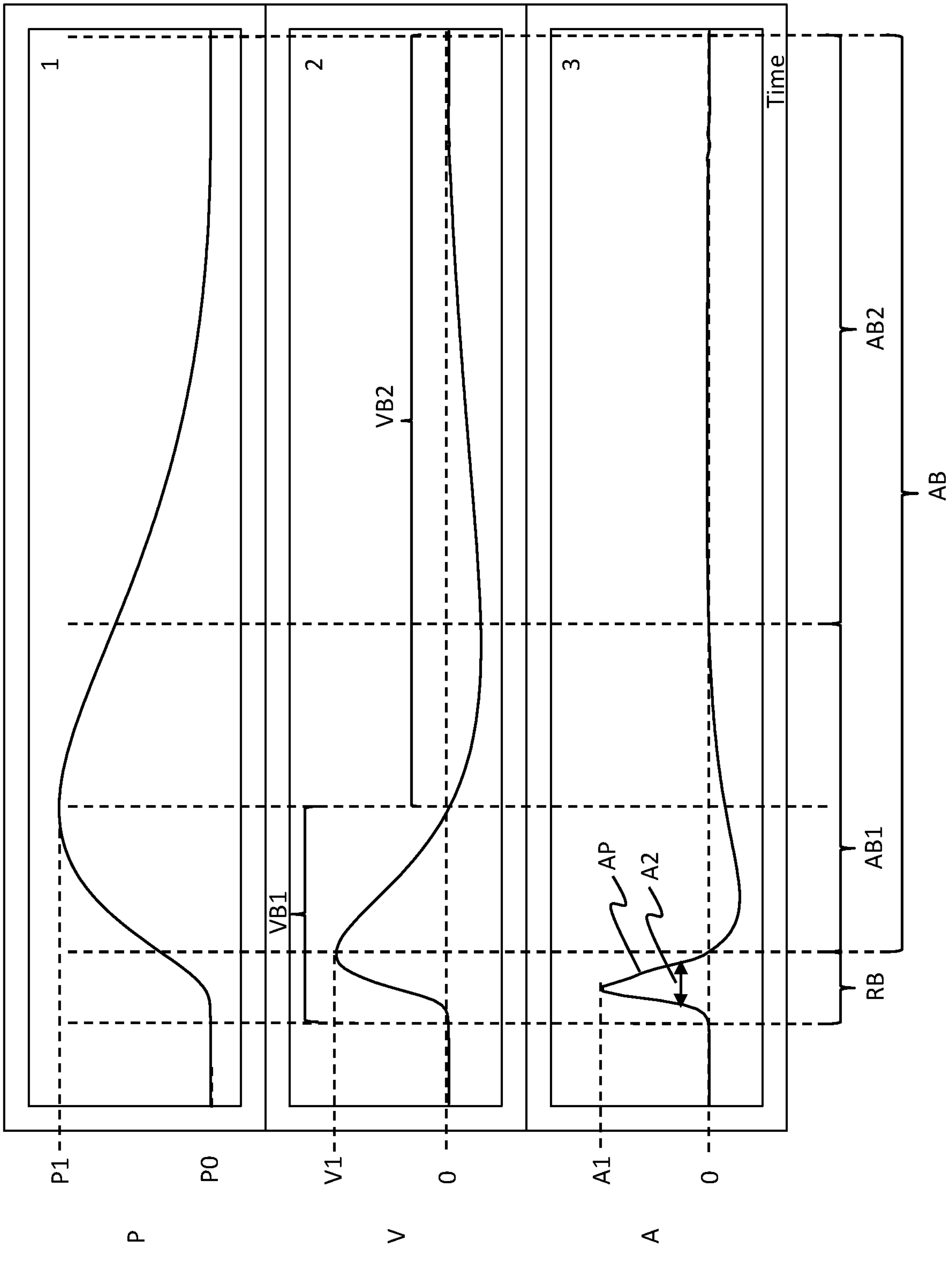
FIG. 11 is a graphical depiction of a movement pattern according to an embodiment.

FIG. 11 shows a graphical depiction of a movement pattern according to an embodiment.

FIG. 11 shows a graphical depiction of an exemplary accelerating movement according to an exemplary movement pattern. FIG. 11 shows both the movement of the rotor 400 relative to the stator module 300 (diagram 1) and the velocity V (diagram 2) or the acceleration A (diagram 3) of the movement of the rotor 400. For this purpose, diagram 1 shows a time curve of a position P of the rotor 400 relative to the stator module 300. In diagram 2, a time course of the velocity V of the change in position of the rotor 400 relative to the stator module 300 shown in diagram 1 is shown. In diagram 3, a time curve of the corresponding acceleration A of the movement of the rotor 400 relative to the stator module 300 is shown.

The velocity V shown in diagram 2 corresponds to the change in time of the movement in diagram 1 and the acceleration A in diagram 3 corresponds to the change in time of the velocity V in diagram 2.

The time curves of position P, velocity V and acceleration A shown in diagrams 1 to 3 are merely examples of a movement pattern. Deviations from the curves shown are also conceivable.

The embodiment of a movement pattern shown in FIG. 11 exclusively shows a single acceleration of the rotor 400 according to an acceleration pulse AP in a corresponding acceleration direction followed by a braking movement with opposite acceleration direction. The corresponding movement here may be a translational movement or a rotational movement of the rotor 400 relative to the stator module 300.

The accelerating movement according to the movement pattern shown is characterized in this context by an acceleration RB in the form of the acceleration pulse AP with an acceleration value A1 and an acceleration duration in the form of a pulse width A2, which is defined as the half-value width of the pulse. The jerky acceleration RB of the acceleration pulse AP here describes a short-term acceleration of the rotor 400, in which over a short period of time, which is given by the pulse width A2, the acceleration A rises steeply to a maximum acceleration value A1 and after reaching the maximum acceleration value A1 drops steeply back to the initial value.

This brief acceleration pulse AP causes a sharp increase in the velocity V of the rotor 400, in which the velocity V rises to a maximum velocity value V1 in a short period of time. In a first velocity range VB1, the velocity curve is characterized in this case by a pulse-shaped velocity curve in which the velocity assumes the maximum velocity value V1 in a steep increase. In the range of the jerky acceleration RB of the acceleration pulse AP, the rotor experiences a rapid change in position, which is characterized in diagram 1 by a steeply rising slope of the time characteristic of the position P.

Following the short acceleration pulse AP in the range of the jerky acceleration RB, in the embodiment shown, a braking AB of the movement of the rotor 400 takes place. The deceleration AB is characterized by a negative acceleration A. Here, the negative acceleration characterizes the acceleration direction of the deceleration AB, respectively of the decelerating movement of the movement pattern, which is opposite to the acceleration direction of the acceleration pulse AP. In contrast to the acceleration pulse AP during the jerky acceleration RB, the deceleration AB of the decelerating movement is characterized by an acceleration course with a small change in time. Thus, the deceleration AB of the rotor 400 is not performed in a jerky manner, but occurs gradually over a long period of time compared to the pulse width A2.

As described above, the acceleration pulse AP of the jerky acceleration RB, due to the inertia of an object 600 arranged on the rotor 400, causes the object 600 to carry out a movement relative to the rotor 400, thereby achieving a change in an arrangement state of the object 600. By gradually decelerating the decelerating movement of the rotor 400, in which the movement of the rotor 400 is slowly decelerated, no new movement of the object 600 relative to the rotor 400 and a further change in the arrangement state associated therewith is caused. Instead, the movement of the object 600 relative to the rotor 400 is smoothly reduced until the object 600 is positioned on the rotor 400 in the changed arrangement state caused by the acceleration pulse AP of the jerky acceleration RB.

In the embodiment shown, the braking AB is divided into a first braking area AB1 and a second braking area AB2. In the first braking region AB1, the acceleration A has a negative value. This generates an acceleration that is directed opposite to the original acceleration of the acceleration pulse AP of the jerky acceleration RB. The negative acceleration value is increased again in the first braking range AB1 in a gently increasing progression and leads towards the end of the first braking range AB1 to an unaccelerated movement.

Due to the negative acceleration in the first braking range AB1, the velocity V in the first velocity range VB1 decreases from the maximum velocity value V1 in a descending edge flatter than the rising edge of the velocity pulse to a zero value at the end of the first velocity range VB1.

The change in position P of the rotor 400 is slowed down by the braking AB and the negative acceleration in the first braking range AB1 until the rotor 400 has arrived at an end position P1. At the end position P1 of the rotor 400, the velocity V has reached zero at the end of the first velocity range VB1.

Due to the negative acceleration in the first braking region AB1 of the deceleration AB, the rotor 400 in the embodiment shown executes a backward movement in which the rotor 400 is moved back from the end position P1 reached toward an initial position P0 from which the rotor 400 was moved by the acceleration pulse AP. Compared to the movement jerkily accelerated by the acceleration pulse AP, this backward movement takes place slowly with low velocity V and low to vanishing acceleration A along a flat falling edge of the movement curve. During the return movement, starting from reaching the end position P1, the movement of the rotor 400 exhibits a negative velocity V during a second velocity range VB2. The negative velocity is increased along a gently rising flank in the second velocity range VB2 until the rotor 400 comes to a stop in the starting position P0.

The first braking range AB1 is followed by a second braking range AB2. In the second braking range AB2, the acceleration A has a small positive value, so that the acceleration A of the second braking range AB2 is again opposite to the acceleration A of the first braking range AB1.

Due to the slightly positive acceleration in the second braking area AB2, which is directed in the opposite direction to the backward movement of the rotor 400 in the direction of the starting position P0, the backward movement of the rotor 400 is gently decelerated so that the rotor 400 finally comes to a standstill in the starting position P0.

The gradual deceleration of the movement of the rotor 400 characterized by the negative acceleration in the first braking region AB1 and the flat positive acceleration edge in the second braking region AB2 and the corresponding slow decrease in velocity V may thus be prevented from causing a further change of the arrangement state by the deceleration. Thus, by this, it may be achieved that a change of the arrangement state is caused exclusively by the jerky acceleration RB and the acceleration pulse AP shown, while by the braking AB and the corresponding gradual decrease of the velocity of the movement of the rotor 400, the respective object is positioned in the changed arrangement state with the rotor 400. Thus, by the jerky acceleration RB, the arrangement state of the object 600 on the rotor 400 may be changed as desired, while by the gradual deceleration of the movement of the rotor 400, the object 600 may be positioned in the changed arrangement state with the rotor 400 so that an association between the object 600 and the rotor 400 may be maintained.

Furthermore, by moving the rotor 400 back to the initial position P0, the acceleration to change the arrangement state of the object 600 positioned on the rotor 400 does not cause an effective movement and associated change in position of the rotor 400 on the stator module 300. Acceleration of the rotor 400 in accordance with the movement pattern shown may thus be repeated as often as desired without thereby generating an effective movement of the rotor 400 in which the rotor 400 is positioned in a different position on the stator module 300 after execution of the movement than it was before the movement began.

In the embodiment shown, the movement pattern comprises only an acceleration pulse AP, which may be used to cause a backward acceleration of the rotor 400 and, associated therewith, a change in an arrangement state of an object 600 arranged on the rotor 400, and an additional braking movement, which is used to move the rotor 400 back to the initial position.

As an alternative, a movement pattern as described above may comprise a plurality of successive acceleration pulses AP and may be embodied as an oscillatory movement pattern.

Following the embodiment shown, an oscillatory movement pattern may be achieved, e.g. by stringing together a plurality of acceleration pulses AP with opposite acceleration directions. As an alternative, a plurality of acceleration pulses AP with a first acceleration direction may be followed by a plurality of acceleration pulses AP with an acceleration direction opposite to the first acceleration direction. The individual acceleration pulses AP may have identical or different acceleration strengths A1 and/or acceleration durations A2. The acceleration pulses may be carried out in immediate succession with respective time gaps between individual pulses. A deceleration AB according to the embodiment shown may be executed for an oscillatory movement pattern following the jerky acceleration including the plurality of consecutive acceleration pulses AP. As an alternative, for an oscillatory movement pattern, braking may be performed immediately after each acceleration pulse AP.

As an alternative to the embodiment of a movement pattern shown in FIG. 11, any accelerating movements are conceivable in which a rotor 400 is accelerated with the aid of a jerky acceleration in accordance with an acceleration pulse and, if necessary, is moved with a braking movement to end the movement of the rotor 400.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 2

List of reference symbols

| | |
|---|---|
| 100 | method for controlling a planar drive system |
| 101 | positioning step |
| 103 | arranging step |
| 105 | transporting step |
| 107 | unloading step |
| 109 | determining step |
| 111 | movement pattern selecting step |
| 113 | first detecting step |
| 115 | adjusting step |
| 117 | second detecting step |
| 119 | force determining step |
| 121 | monitoring step |
| 200 | planar drive system |
| 201 | controller |
| 203 | data link |
| 300 | stator module |
| 301 | carrier |
| 303 | stator surface |
| 305 | stator module housing |
| 307 | stator assembly |
| 308 | stator segment |
| 309 | stator conductor |
| 310 | contact structure |
| 311 | stator conductor gap |
| 400 | rotor |
| 401 | magnet assembly |
| 402 | running surface |
| 403 | free surface |
| 405 | fastening structure |
| 407 | first rotor direction |
| 409 | second rotor direction |
| 411 | first magnet unit |
| 413 | second magnet unit |
| 415 | third magnet unit |
| 417 | fourth magnet unit |
| 500 | sensor module |
| 501 | magnetic field sensor |
| 503 | first periodic grid |
| 505 | second periodic grid |
| 507 | first direction |

TABLE 2-continued

| List of reference symbols | |
|---|---|
| 509 | second direction |
| 600 | object |
| 601 | component |
| 603 | container |
| 605 | bulk |
| 607 | fluid |
| 609 | sorting device |
| 611 | receiving chute |
| 613 | sorting chute |
| 615 | output element |
| 617 | portioning device |
| 700 | monitoring device |
| D | direction of movement |
| R | rotational axis |
| T | translational acceleration direction |
| P | position |
| P0 | output position |
| P1 | end position |
| V | velocity |
| V1 | maximum velocity value |
| VB1 | first velocity range |
| VB2 | second velocity range |
| A | acceleration |
| AP | acceleration pulse |
| A1 | maximum acceleration value |
| A2 | pulse width |
| RB | jerky acceleration |
| AB | deceleration |
| AB1 | first braking range |
| AB2 | second braking range |

The invention claimed is:

1. A method for controlling a planar drive system, wherein the planar drive system comprises at least a controller, a stator module having a stator surface and a rotor which is positionable and movable on the stator surface, wherein a magnetic coupling is achievable between a rotor magnetic field of the rotor and stator magnetic fields generated by the stator module, and wherein a movement of the rotor relative to the stator module is allowed for by a targeted control of the stator magnetic fields, the method comprising:

positioning an object on a rotor in a first arrangement state of the object relative to the rotor in a positioning step, wherein the object is configured as a solid object or as a liquid object or as a powdered object or as a granular object;

carrying out an accelerating movement of the rotor according to a defined movement pattern and by the accelerating movement arranging the object positioned on the rotor in the first arrangement state relative to the rotor into a second arrangement state relative to the rotor in an arranging step;

wherein the first or second arrangement state comprises at least one of positioning or orienting the object relative to the rotor, a degree of ordering or sorting of a plurality of such objects, a degree or state of mixing or demixing of the object, a degree or state of dissolution of a granular, powdered or liquid configuration of the object having at least two components, or a degree or state of compacting of the object configured as a bulk material, wherein the accelerating movement of the rotor is achieved by actuating the stator magnetic fields accordingly, wherein the movement pattern comprises at least an acceleration pulse having an acceleration strength and an acceleration duration in an acceleration direction, wherein the movement pattern comprises an accelerated translational movement in a translational acceleration direction and/or an accelerated rotational movement about a rotational axis, and wherein the translational acceleration direction and/or the rotational axis are oriented in an arbitrarily selectable spatial direction or in arbitrarily selectable spatial directions, such that the acceleration direction and/or the rotational axis are orientable along any spatial direction, or along any spatial directions, wherein the rotation axis is orientable perpendicular and parallel to the stator surface;

wherein the movement pattern further comprises a superposition of a plurality of said accelerated translational movement in differently oriented translational acceleration directions and/or a plurality of said accelerated rotational movement about different rotational axes.

2. The method according to claim 1, wherein the movement pattern comprises an oscillatory movement pattern with temporally successive acceleration pulses in oppositely oriented acceleration directions, and wherein the movement pattern has a variable frequency.

3. The method according to claim 2, wherein the movement pattern is a movement pattern that is individually adjustable to the object, and wherein a translation acceleration direction and/or a rotational axis and/or a number of successive acceleration pulses and/or a frequency and/or an acceleration strength of the acceleration pulses and/or an acceleration duration of the acceleration pulses and/or an execution duration of the movement pattern is adjustable; or wherein the movement pattern is a predefined movement pattern of a plurality of predefined movement patterns stored in a database with predefined translation acceleration direction and/or with predefined rotational axis and/or with predefined number of successive acceleration pulses and/or with predefined frequency and/or with predefined acceleration strength of the acceleration pulses and/or with predefined acceleration duration of the acceleration pulses and/or with predefined execution duration of the movement pattern.

4. The method according to claim 1, wherein the movement pattern further comprises a braking movement, wherein the braking movement comprises an acceleration direction opposite to the acceleration direction of the acceleration pulse, wherein the braking movement has a smaller acceleration strength and/or a larger acceleration duration and/or a smaller temporal acceleration change than the acceleration pulse, and wherein the braking movement moves the rotor to an initial position of the rotor prior to the start of the accelerating movement.

5. The method according to claim 1, further comprising:

moving the rotor from a first position of the rotor relative to the stator module to a second position of the rotor relative to the stator module and transporting the object arranged on the rotor in a transporting step, wherein the accelerating movement is performed simultaneously with the moving of the rotor.

6. The method according to claim 5, further comprising unloading the object in the second arrangement state of the rotor in the second position of the rotor relative to the stator module in an unloading step.

7. The method according to claim 1, further comprising:

determining a type of the object, the first arrangement state of the object and the second arrangement state of the object to be achieved in a determining step, wherein the type of the object comprises a size, a shape, a mass, a form, a bulk property, a liquid property, a degree of mixing, or a degree of dissolution of the object, and wherein the first arrangement state and the second arrangement state comprise, depending on the type of object, a positioning and/or orientation relative to the rotor, a degree of compaction, a degree of mixing, a degree of de-mixing, or a degree of dissolution of the object; and selecting a movement pattern from a list of possible movement patterns, wherein the movement pattern defines a translational acceleration direction and/or a rotational axis and/or a number of successive acceleration pulses and/or a frequency and/or an acceleration strength of the acceleration pulses and/or an acceleration duration of the acceleration pulses and/or an execution duration of the movement pattern, which is or are suitable for transferring the object from the first arrangement state to the second arrangement state, in a movement pattern selecting step.

8. The method according to claim 1, wherein the arranging step comprises:

monitoring the object and detecting one of the first or second arrangement state of the object in a first detecting step;

adjusting the execution of the accelerating movement in the arranging step on the basis of the detected first or second arrangement state in an adjusting step, wherein adjusting the execution of the accelerating movement comprises adjusting the movement pattern or executing a further movement pattern; and/or monitoring the object during the arranging step and detecting the object in the second arranging state and terminating the accelerating movement in a second detecting step.

9. The method according to claim 8, wherein the first detecting step and/or the second detecting step comprises:

determining a magnetic force required to hold the rotor in a floating position above the stator surface of the stator module with the aid of the magnetic coupling between the rotor magnetic field and the stator magnetic field, and/or required to accelerate and/or decelerate the rotor in the accelerating movement with the aid of the magnetic coupling between the rotor magnetic field and the stator magnetic field and/or required to move the rotor with the aid of the magnetic coupling between the rotor magnetic field and the stator magnetic field, in a force determining step; and determining the first arrangement state and/or the second arrangement state of the object taking into account the required magnetic force.

10. The method according to claim 8, wherein the first detecting step and/or the second detecting step comprise:

monitoring the object on the rotor via a monitoring device in a monitoring step, wherein the monitoring device is configured as an optical monitoring device or as an acoustic monitoring device or as an electromagnetic monitoring device and is configured to determine the first or second arrangement state of the object by receiving corresponding optical or acoustic or electromagnetic measuring signals.

11. The method according to claim 7, wherein determining the type of the object in the determining step and/or selecting the movement pattern in the movement pattern selecting step and/or detecting the arrangement state in a first detecting step and/or adjusting the movement pattern in an adjusting step and/or detecting the object in the second arrangement state in a second detecting step is performed by a correspondingly trained neural network or by a plurality of correspondingly trained neural networks.

12. The method according to claim 1, wherein the object comprises a component or a plurality of components, and wherein the first and second arrangement states of the object relative to the rotor comprise a first and second position of each of the components on the rotor and/or a first and second orientation of each of the components relative to the rotor;

wherein the first and second positions of the component on the rotor are convertible from one to another by a translational movement of the component on the rotor, and/or wherein the first and second orientations of the component relative to the rotor are convertible from one to another by a rotation of the component about a rotational axis; and wherein via movement of the rotor being accelerated in a jerky manner based on the accelerating pulse the object carries out translational movement and/or tilting movement and/or rotary movement relative to the rotor, due to inertia of the object.

13. The method according to claim 1, wherein the object comprises a bulk material filled into a container, and wherein the first or second arrangement state of the object comprises filling the bulk material in the container with a selected filling density.

14. The method according to claim 1, wherein the object comprises a bulk material and/or fluid filled into a container with at least two components, and wherein the first or second arrangement state of the object comprises filling the bulk material or fluid in the container with a selected mixing or de-mixing of the at least two components.

15. The method according to claim 1, further comprising sorting a plurality of components into a sorting device provided for this purpose by positioning the sorting device and the components on the rotor and carrying out the accelerating movement of the rotor, wherein the sorting device comprises at least a receiving opening which is suitable for receiving at least one of the components.

16. The method according to claim 1, further comprising compacting and/or loosening a bulk material in a container provided for receiving the bulk material by positioning the container filled with the bulk material on the rotor and carrying out the accelerating movement of the rotor.

17. The method according to claim 1, further comprising mixing a bulk material with at least two components in a container provided for receiving the bulk material by positioning the container filled with the bulk material on the rotor and carrying out the accelerating movement of the rotor.

18. The method according to claim 1, further comprising de-mixing a bulk material having at least two components and separating the at least two components into a respective container provided for receiving the bulk material by positioning the container filled with the bulk material on the rotor and carrying out the accelerating movement of the rotor, wherein the container further comprises a filter element.

19. A planar drive system configured to execute the method according to claim 1, having:

at least a controller, a stator module having a stator surface and a rotor which is positionable on the stator surface, wherein the magnetic coupling is achievable between the rotor magnetic field of the rotor and stator magnetic fields generated by the stator module, wherein the movement of the rotor relative to the stator module is allowed for via a targeted control of the stator magnetic fields.

* * * * *